United States Patent [19]
Amendt et al.

[11] Patent Number: 5,941,792
[45] Date of Patent: Aug. 24, 1999

[54] METHOD OF AND APPARATUS FOR REGULATING CRAWLING MOVEMENTS OF MOTOR VEHICLES

[75] Inventors: Oliver Amendt, Bühl; Franz Kosik, Ostfildern; Thomas Grass, Urbach, all of Germany

[73] Assignees: LuK Getriebe-Systeme GmbH, Buhl/Baden; Daimler-Benz Aktiengesellschaft, Stuttgart, both of Germany

[21] Appl. No.: 08/968,707

[22] Filed: Nov. 13, 1997

[30] Foreign Application Priority Data

Nov. 23, 1996 [DE] Germany ............ 196 48 554

[51] Int. Cl.$^6$ .................................................. B60K 41/22
[52] U.S. Cl. ................................. 477/74; 477/84
[58] Field of Search .................... 477/73, 74, 78, 477/84, 85

[56] References Cited

U.S. PATENT DOCUMENTS 4,618,043 10/1986 Hattori et al. ............................ 477/84
5,176,234 1/1993 Reik et al. ................................ 477/74
5,632,706 5/1997 Kremmling et al. ..................... 477/74

Primary Examiner—Dirk Wright
Attorney, Agent, or Firm—Darby & Darby

[57] ABSTRACT

A power train in a motor vehicle has an automated clutch which is operated by a control unit by way of an actuator. The control unit receives signals from various parts of the engine, from the brake or brakes and from the transmission; such signals are processed and transmitted to the clutch by way of the actuator so that, when the vehicle is to carry out a crawling movement, the torque being transmitted by the then partly engaged clutch is properly related to the engine torque to ensure a predictable crawling movement of the vehicle regardless of eventual shifts of the operating point of the clutch and/or fluctuations of other parameters of the engine, transmission and/or clutch. The crawling movement can begin when the brake(s) is or are idle, the gas pedal is not depressed, and the engine is running; and crawling movement begins in response to shifting of the transmission into gear.

52 Claims, 8 Drawing Sheets

METHOD OF AND APPARATUS FOR REGULATING CRAWLING MOVEMENTS OF MOTOR VEHICLES

BACKGROUND OF THE INVENTION

The invention relates to motor vehicles in general, and more particularly to improvements in power trains of motor vehicles. Still more particularly, the invention relates to power trains of the type wherein a prime mover (such as an internal combustion engine) can transmit torque to an automated torque transmitting system (such as a friction clutch) which, in turn, can transmit torque to the input element of a transmission system shiftable (manually or automatically) into a plurality of gears. A power train of such character further comprises means for operating the automated torque transmitting system, preferably a signal-receiving and signal-transmitting control unit and actuating means for changing the condition of the torque transmitting system (such as the extent of engagement of a friction clutch) in response to signals from the control unit. The control unit can receive signals from monitoring means including one or more sensors, electric circuits and/or other signal generating and signal transmitting means, and such control unit can embody means for ascertaining the torque (Mmot) of the prime mover and an arrangement serving to compare rises and drops of torque (Mk) being transmitted by the automated system with rises and drops of the torque being transmitted by the prime mover.

Power trains of the above outlined character are disclosed, for example, in published German patent applications Serial Nos. 40 11 850, 44 26 260 and 195 04 847 to which reference may be had, if necessary. The disclosures of all U.S. patents and allowed U.S. patent applications specifically mentioned in this specification as well as of those corresponding to any and all foreign patents and patent applications identified in this specification are incorporated herein by reference.

Power trains of the type disclosed in the aforementioned German patent applications normally comprise a prime mover (such as an internal combustion engine or a hybrid system with a combustion engine and energy storing means and/or an electric motor). The prime mover can transmit torque to the input element of an automated torque transmitting system which can transmit torque to a manually or automatically shiftable transmission system. The condition of the torque transmitting system (such as a friction clutch) can be regulated or controlled by operating means including a control unit and actuating means (also called actuator) serving to directly or indirectly adjust the automated torque transmitting system, i.e., the latter can be caused to assume a fully engaged or a fully disengaged condition or any one of a plurality (e.g., an infinite number) of partly engaged conditions. The output element of the automated torque transmitting system can transmit torque to a transmission in the form of a manually shiftable multistage reduction gear or of an automated transmission cooperating with one or more actuator serving to automatically select and/or shift the automated transmission into a particular gear. The transmission system can operate with or without interruption of tractive power or force.

If a vehicle embodying a power train of the above outlined character is to perform a creeping or crawling movement as a result of planned (intentional) engagement of the automated torque transmitting system, the resulting movement is rather unpredictable (such as jerky and/or too fast). As a rule, or at least in many instances, such crawling movement is carried out by selecting the torque of the automated torque transmitting system in accordance with a characteristic curve, and the unpredictabilty of the resulting crawling movement is attributable, for example, to a shift of the operating point of an automated torque transmitting system (such as a friction clutch), namely to a shift of the exact point or setting when the automatic torque transmitting system begins to transmit torque during adjustment from the fully disengaged condition toward the engaged condition.

If the engagement of an automated clutch, for the purpose of initiating a crawling or creeping movement of the motor vehicle, is realized by regulating the extent of adjustment of the clutch from its fully disengaged condition, namely by selecting a fixed value or extent of such adjustment, the crawling or creeping torque can vary as a function of several factors (such as the circumstances under which the motor vehicle is to perform a crawling movement) with the result that the rate at which the vehicle begins and proceeds to carry out a crawling movement can deviate from (by being faster or slower than) the desired or contemplated or customary rate.

On the other hand, it is highly desirable that the motor vehicle begin to crawl and to thereupon proceed with a crawling movement at a rate and in a manner as anticipated by the operator of the motor vehicle, i.e., the vehicle should be capable of carrying out a crawling movement which is as homogeneous and as predictable and comfortable (to the operator as well as to other occupant(s) of the vehicle) as possible. In other words, the operator as well as any other occupant(s) of the motor vehicle should be capable of expecting a predictable and at least substantially unchanging sensation whenever and as often as the vehicle is caused to perform a crawling movement. Thus, there exists an urgent need to enhance the ability of the power train in a motor vehicle to ensure a predictable and at least substantially unchanging smooth and comfortable initiation and carrying out of a crawling movement during the entire useful life of the vehicle.

OBJECTS OF THE INVENTION

An object of the invention is to provide a vehicle with a novel and improved power train which can ensure predictable and comfortable crawling or creeping movements of the vehicle.

Another object of the invention is to provide a novel and improved method of initiating and carrying out crawling, creeping, shunting and analogous movements of a motor vehicle.

A further object of the invention is to provide a novel and improved method of ensuring predictable crawling movements of a motor vehicle even if the operating point of the automated torque transmitting system (such as a friction clutch) happens to migrate during the useful life of the motor vehicle or its power train.

An additional object of the invention is to provide a power train which is constructed and assembled and can be operated in such a way that the operator of the motor vehicle can anticipate a predictable and unchanging crawling movement whenever such movement becomes necessary or is selected by the operator for any other reason.

Still another object of the invention is to provide a simple, compact, inexpensive and reliable operating means for the automated torque transmitting system which can be utilized in the above outlined power train.

A further object of the invention is to provide a power train which enhances the comfort to the operator and other occupants (if any) of a motor vehicle during crawling of the motor vehicle in a simple and efficient manner.

Another object of the invention is to provide a motor vehicle which embodies a power train of the above outlined character.

An additional object of the invention is to provide a power train which can stand long periods of use, whose operation is highly reliable, and which is not subject to extensive wear.

Still another object of the invention is to provide a novel and improved combination of a control unit and an actuator for use in the above outlined power train.

SUMMARY OF THE INVENTION

One feature of the instant invention resides in the provision of a power train which is installed in a motor vehicle and comprises a prime mover (such as an internal combustion engine), a transmission system which is shiftable (manually or automatically) into a plurality of different gears (such as neutral, reverse and a number of forward gears), an automated torque transmitting system (such as a friction clutch) which is actuatable to assume engaged and disengaged conditions as well as partly engaged conditions for transmission of torque at a rate which, when the transmission system is in one of the gears and the torque transmitting system assumes at least one of its partly engaged conditions, results in a crawling or creeping movement of the vehicle, and means for operating the automated torque transmitting system including a signal receiving and signal transmitting control unit and means (such as one or more actuators) for actuating the automated torque transmitting system for transmission of torque at the aforementioned rate in response to signals from the control unit to repeatedly ensure predetermined crawling movements of the motor vehicle.

The aforementioned actuator or actuators can be designed in such a way that each thereof comprises at least one driving unit (e.g., an electric motor or a fluid-operated motor) for a mobile input element (such as a lever or a bearing or a rod or a shaft) of the automated torque transmitting system.

Another feature of the invention resides in the provision of a power train which is or which can be incorporated in a motor vehicle (such as a passenger car) and comprises an energy consuming (such as fuel-operated), variable-speed variable torque transmitting prime mover (e.g., an internal combustion engine), at least one brake (such as a vehicle brake or a parking brake) which is engageable to influence the speed of the vehicle, a member (such as a gas pedal) which is operable to regulate the admission of energy to the prime mover, a (manual or automated) transmission which is shiftable into a plurality of gears (including reverse gear and a plurality of forward gears), an automated torque transmitting system (such as a friction clutch) which is actuatable to assume engaged and disengaged conditions as well as partly engaged conditions, means for operating the torque transmitting system including a signal receiving, processing and transmitting control unit and means (such as at least one actuator) for actuating the torque transmitting system in response to signals from the control unit, and means for transmitting to the control unit signals denoting the condition of the at least one brake, the condition of the energy admission regulating member and changes of torque being transmitted by the prime mover and/or by the torque transmitting system. The control unit comprises means for comparing torques being transmitted by the torque transmitting system with torques being transmitted by the prime mover and for causing, in the disengaged condition of the at least one brake and in the non-operated condition of the energy admission regulating member, the torque transmitting system to assume that one of its partly engaged conditions in which the vehicle is crawling or creeping in response to shifting of the transmission into one of the (forward and reverse) gears with a resulting change of torque being transmitted by the torque transmitting system from a first value to a second value. At least one of (a) the torque of the prime mover and (b) the rise of torque being transmitted by the prime mover at least approximates a predeterminable value when the torque being transmitted by the torque transmitting system at least approximates the second value.

The at least one actuator can comprise at least one driving unit (such as an electric motor or a fluid-operated motor) for a mobile input element of the torque transmitting system.

The means for transmitting signals to the control unit can comprise an electronic circuit for the prime mover and, if desired or necessary, a circuit for the antiblocking system and/or a circuit for the antiskid regulating system.

The aforementioned resulting change of torque being transmitted by the automated torque transmitting system from the first value to the second value can involve a rise of torque.

The means for transmitting signals to the control unit can comprise means for ascertaining the rise of torque being transmitted by the prime mover in the following way: determining a first torque $Mmot1$ of the prime mover essentially prior to assumption by the torque transmitting system of the one (partly engaged) condition, determining a second torque $Mmot2$ of the prime mover while the motor vehicle is crawling, and determining the difference $Mmot2-Mmot1$. A signal corresponding to such difference is transmitted to the control unit.

The means for transmitting signals to the control unit can further include means for carrying out at least one of the operations including (a) ascertaining and (b) determining the torque which is being transmitted by the prime mover while the automated torque transmitting system assumes a predetermined condition, preferably the aforementioned disengaged condition.

Still further, the means for transmitting signals can include means for repeatedly determining or ascertaining, as a function of time, the torque which is being transmitted by the prime mover.

The means for transmitting signals to the control unit can include means for ascertaining or determining and transmitting to the control unit signals denoting that particular torque which is being transmitted by the prime mover during shifting of the transmission into one of its gears. The control unit of such power train can further comprise means for comparing the aforementioned particular torque with the predeterminable value (Mdiff), and the operating means of such power train can further comprise means for preventing automatic changes in the condition of the automated torque transmitting system when the particular torque at least approximates the predeterminable value Mdiff.

The means for transmitting signals to the control unit can include means for ascertaining and transmitting to the control unit first and second signals which respectively denote the torque being transmitted by the prime mover to the automated torque transmitting system during and prior to shifting of the transmission into one of its gears. The control unit of such power train can comprise means for generating third signals denoting differences between the first and second signals and for comparing characteristics of the third signals with characteristics of a fourth signal denoting the predeterminable value Mdiff, and the actuating means can include means for preventing automatic changes in the condition of the automated torque transmitting system when the characteristics of a third signal at least approximate the characteristics of the fourth signal denoting the predeterminable value Mdiff.

The means for transmitting signals to the control unit can include means for ascertaining and transmitting to the control unit first signals which denote the torque being transmitted by the prime mover prior to shifting of the transmission into the one gear and while the torque transmitting system is at least substantially disengaged, and for ascertaining and transmitting to the control unit second signals denoting the torque being transmitted by the prime mover while the motor vehicle is crawling. The actuating means of the operating means in such power train can comprise means for thereafter changing the condition of the torque transmitting system in a sense or direction to increase the torque which is transmittable by the torque transmitting system, and the control unit can comprise means for ascertaining the difference between the first and second signals. The actuating means is then operative to prevent a change in the condition of the torque transmitting system or to reduce the extent of engagement of the torque transmitting system by a preselectable value (including zero) in response to at least one of (a) a rise of the prime mover torque denoted by the second signals, and (b) a rise of the aforementioned difference between the first and second signals beyond a preselectable threshold value.

The means for transmitting signals to the control unit can comprise means for indirectly ascertaining the changes of torque being transmitted by the prime mover, e.g., by monitoring a parameter which varies at the rate of variation of torque being transmitted by the prime mover. To this end, the means for transmitting signals can include an electrical or electronic circuit which generates signals denoting the torque being transmitted by the prime mover.

It is also possible to design the control unit in such a way that it embodies means for ascertaining the torque being transmitted by the prime mover.

Still further, the means for transmitting signals to the control unit can comprise a data bus for signals denoting the torque being transmitted by the prime mover.

The member which regulates the supply of energy being admitted to the prime mover can constitute a mobile member (such as a pivotable or depressible gas pedal) having a plurality of positions, and the means for transmitting signals to the control unit can include means for ascertaining the torque being transmitted by the prime mover on the basis of at least one of a plurality of parameters of the prime mover including (a) the RPM of a rotary component (e.g., a crankshaft or a camshaft) of the prime mover, (b) the position of a mobile element (such as a pivotable flap) of a throttle valve of the prime mover, (c) the position of the energy supply regulating member, (d) the quantity of energy, e.g., in the form of fuel being injected into cylinders of the prime mover, (e) the timing of fuel injection, and (f) changes of the RPM of the aforementioned rotary component (such as a crankshaft or a camshaft) per unit of time.

The control unit can include one or more memories for recoverable information, e.g., for information pertaining to the torque being transmitted by the prime mover.

Still further, the control unit can include means for generating signals which denote changes of the torque being transmitted by the prime mover and/or by the automated torque transmitting system.

As already mentioned above, the operating means, and particularly the control unit, can comprise means for comparing signals which denote changes of torque being transmitted by the prime mover and/or by the automated torque transmitting system.

The at least one actuator of the actuating means between the control unit and the automated torque transmitting system can be directly or indirectly coupled to an input element of the automated torque transmitting system.

The actuating means of the operating means can be designed to select the condition of the automated torque transmitting system in dependency upon at least one function. The at least one function is or can be a function of at least one of (a) time, (b) torque being transmitted by the prime mover, (c) the RPM of a rotary part (such as a crankshaft or a camshaft) of the prime mover, and (d) the speed of the motor vehicle.

The at least one function is preferably a function of time within at least one predetermined interval of time. For example, the actuating means can be arranged to select the condition of the automated torque transmitting system in dependency upon a first function of time during a first interval, and in dependency upon a second function of time during a second interval. In accordance with a presently preferred embodiment, the actuating means is arranged to change the condition of the torque transmitting system from the disengaged condition to a preselectable partly engaged condition during the first interval, and to change the condition of the torque transmitting system from the preselectable partly engaged condition to a different condition during the second interval.

Alternatively, the actuating means can be arranged to change the condition of the torque transmitting system from the disengaged condition to a partly engaged first condition during the aforementioned first interval, and to a second condition of engagement which is more pronounced than the first condition; the second condition is reached when a predetermined value is assumed by at least one of (a) the torque being transmitted by the prime mover and (b) a difference between the first and second torques being transmitted by the prime mover. The operating means of such power train can be arranged to adjust the torque transmitting system toward the disengaged condition to thus reduce the magnitude of the torque being transmitted by the torque transmitting system upon reaching of the second condition. It is also possible to arrange the operating means to adjust the torque transmitting system toward the disengaged condition to thus reduce by a predetermined value the magnitude of the torque being transmitted by the torque transmitting system upon reaching of the second condition.

The operating means can select the condition of the automated torque transmitting system in dependency upon at least one of several functions of time including a linear function, a square function and an exponential function. Furthermore, the actuating means of the operating means can vary the condition of the torque transmitting system at a first speed during a first interval of time, and at a second speed during a second interval of time. The control unit can include means for terminating the crawling movement of the motor vehicle and for simultaneously changing the condition of the torque transmitting system toward the disengaged condition as a function of time, For example, the means for terminating the crawling movement of the vehicle can be responsive to engagement of the brake. The means for changing the condition of automated torque transmitting system toward the disengaged condition can be arranged to reduce the ability of the torque transmitting system to transmit torque during a first interval of time and to further reduce the ability of the torque transmitting system to transmit torque down to a preselectable value during a second interval of time, The preselectable value can be zero or it can at least approximate zero.

The actuating means can comprise means for regulating the condition of the torque transmitting system by controlling the extent of movement of a mobile part of the torque transmitting system as a function of a characteristic curve denoting a relationship between the extent of movement of the mobile part and the torque which can be transmitted by the torque transmitting system.

The actuating means can comprise means for controlling or regulating the torque which is being transmitted by the torque transmitting system from a lower or lesser first torque to a higher or greater second torque at which (second torque) the motor vehicle is being driven at a preselectable speed.

Still further, the actuating means can comprise means for controlling or regulating the torque which is being transmitted by the torque transmitting system from a lower first torque to a higher second torque at which the torqe being transmitted by the prime mover assumes a preselectable value.

The actuating means can also comprise means for controlling or regulating the torque being transmitted by the automated torque transmitting system from a lower first torque to a higher second torque at which the torque being transmitted by the prime mover is increased by a preselected value.

A further feature of the invention resides in the provision of a power train which can be utilized in a motor vehicle and comprises an energy consuming variable-speed variable torque transmitting prime mover, at least one brake which is engageable to influence the speed of the vehicle, a member which is operable to regulate the admission of energy to the prime mover, a transmission which is shiftable into a plurality of gears, an automated torque transmitting system which is actuatable to assume engaged and disengaged conditions as well as partly engaged conditions, means for operating the torque transmitting system including a signal receiving, processing and transmitting control unit and means for actuating the torque transmitting system in response to signals from the control unit, and means for transmitting to the control unit signals denoting the condition of the energy admission regulating member and the torque which is being transmitted by the prime mover in the at least substantially disengaged and in at least partly engaged conditions of the torque transmitting system. The control unit comprises means for causing, in the disengaged condition of the at least one brake and in the non-operated condition of the energy admission regulating member, the torque transmitting system to assume that one of a plurality of partly engaged conditions in which the motor vehicle is crawling or creeping in response to shifting of the transmission into one of the gears with a resulting rise of torque which is being transmitted by the torque transmitting system from a first value to a higher second value which latter is reached when a difference between the torques being transmitted by the prime mover in the aforementioned substantially disengaged and the aforementioned at least one partly engaged condition assumes a preselected value.

The actuating means can comprise at least one actuator with a driving unit in the form of an electric motor, a pneumatically or hydraulically operated motor or any other suitable motor. The automated torque transmitting system can comprise a clutch, such as a friction clutch, and the means for transmitting signals to the control unit can comprise an electronic or another suitable circuit for the prime mover.

An additional feature of the invention resides in the provision of a method of varying the condition of an automated torque transmitting system (such as a friction clutch) which has engaged and disengaged conditions as well as a plurality of partly engaged conditions and is installed in a power train of a motor vehicle wherein the power train further comprises a torque transmitting prime mover, a transmission which is shiftable into a plurality of gears, means for operating the torque transmitting system including a signal receiving and signal transmitting control unit and actuating means serving to effect changes of the condition of the torque transmitting system in response to signals from the control unit, and means for transmitting to the control unit first signals denoting the torque being transmitted by the prime mover and second signals denoting differences between varying torques Mk1 and Mk2 being transmitted by the torque transmitting system on the one hand and varying torques being transmitted by the prime mover on the other hand. The improved method comprises the steps of:

(1) ascertaining the torque Mmot1 being transmitted by the prime mover in at least substantially disengaged condition of the torque transmitting system;

(2) shifting the transmission into gear to effect a crawling or creeping movement of the motor vehicle in response to a change in the condition of the torque transmitting system to a partly engaged condition with attendant rise of the torque being transmitted by the torque transmitting system from a first to a second value while the vehicle brake or brakes is or are disengaged and the gas pedal is not actuated;

(3) ascertaining the torque Mmot2 of the prime mover during shifting of the transmission into gear;

(4) thereafter increasing the torque being transmitted by the prime mover;

(5) comparing the difference Mk2−Mk1 with the difference Mmot2−Mmot1; and (6) raising Mk2 until one of Mmot2−Mmot1 and Mmot2 matches a preselected value.

Either Mmot2−Mmot1 or Mmot2 (or both) can be in the range of between about 5 and 50 Nm, preferably between about 8 and 20 Nm, and most preferably about 10 Nm.

The value of Mk2 can be in the range of between 5 and 50 Nm, preferably between about 10 and 40 Nm, and most preferably about 10 Nm.

The novel features which are considered as characteristic of the invention are set forth in particular in the appended claims. The improved power train itself, however, both as to its construction and the methods of assembling, installing and operating the same, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figure 1:
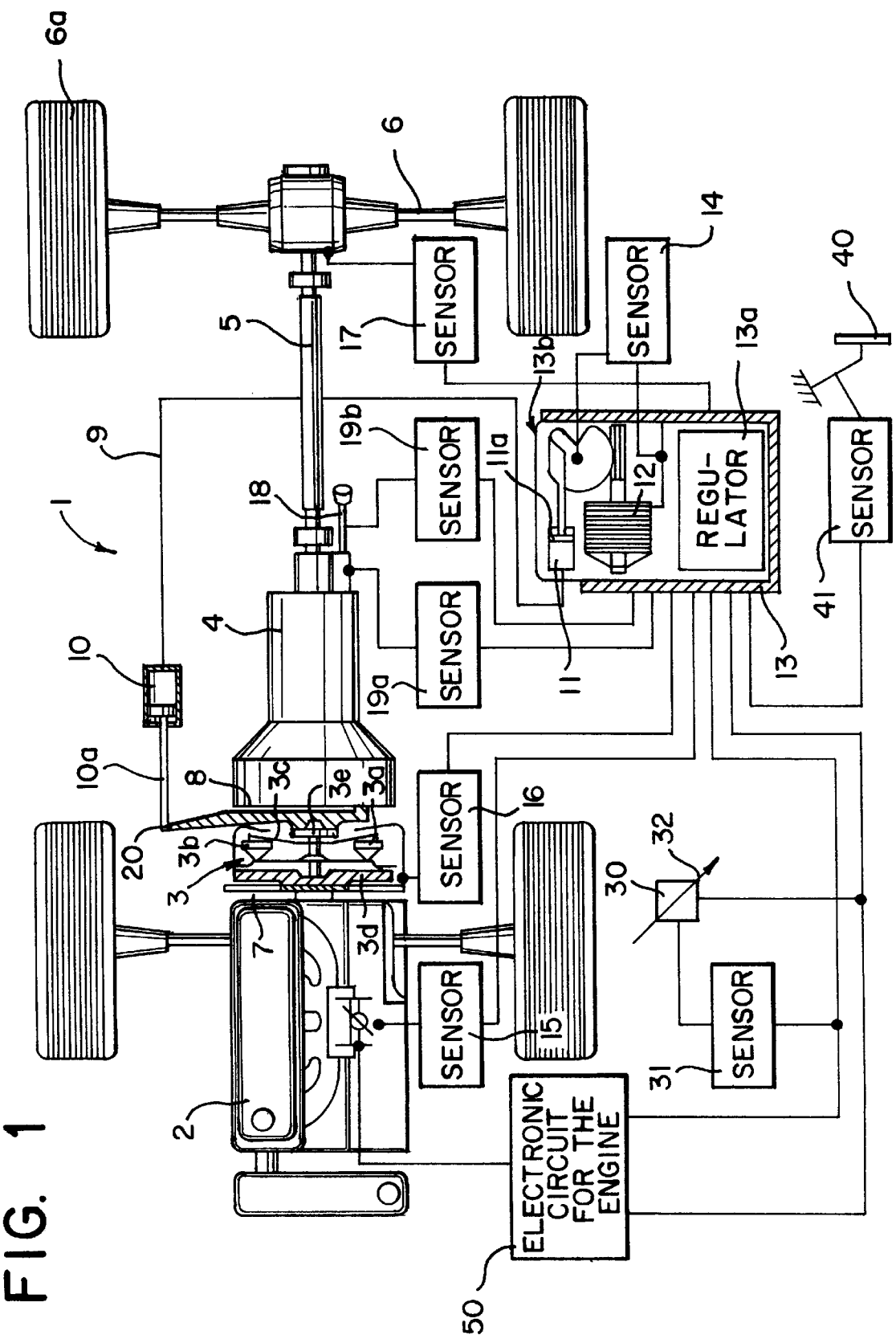
FIG. 1 is a fragmentary schematic partly plan and partly sectional view of a motor vehicle including a power train which embodies one form of the invention.

FIG. 1 illustrates certain component parts of a motor vehicle 1 which comprises a power train including a torque transmitting prime mover 2 (such as a motor or an internal combustion engine). The latter can transmit torque Mmot to the input element (e.g., a flywheel 3d) of an automated torque transmitting system 3 (such as a friction clutch and hereinafter called clutch for short) which, in turn, can transmit torque Mk to the input element of a manually or automatically shiftable transmission 4. The clutch 3 is shown as being installed in the power flow between the prime mover 2 (hereinafter called engine for short) and the transmission 4, and the output shaft 5 of the transmission drives a differential for driven axles 6 which transmit rotary motion to driven wheels 6a.

The illustrated friction clutch 3 can be replaced with a multiple-disc clutch, a magnetic powder clutch or the bypass or lockup clutch of a hydrokinetic torque converter, e.g., a torque converter as disclosed in commonly owned U.S. Pat. No. 5,377,796 granted Jan. 3, 1995 to Friedmann et al. for "APPARATUS FOR TRANSMITTING FORCE BETWEEN ROTARY DRIVING AND DRIVEN UNITS".

The transmission 4 in the power train of the motor vehicle 1 is a manually shiftable transmission (e.g., a multiple reduction gear or range gear); however, the clutch 3 can be combined with an automated transmission which is operated by one or more actuator receiving signals from a discrete control unit or from a control unit which is common to such automated transmission as well as to the engine 2 and/or the clutch 3. If the illustrated manually shiftable transmission 4 is replaced with an automated transmission, the latter can be operated with interruption of traction force when the transmission is being shifted into a different gear by one or more actuators including one or more electric motors, fluid-operated motors or other suitable driving units. However, it is equally possible to employ an automated transmission which is designed to shift into different gears basically without any interruption of traction force; such transmissions normally operate with multistage planetary gearings.

Still further, it is possible to employ an infinitely variable speed transmission, for example, a transmission of the type disclosed in commonly owned U.S. Pat. No. 5,169,365 granted Dec. 8, 1992 to Friedmann for "POWER TRAIN". Moreover, an automated transmission can be installed in a power train ahead of a friction clutch or another torque transmitting system, and the torque transmitting system can also be used as a starter clutch, as a direction reversing clutch and/or as a safety clutch capable of transmitting torque in an accurately planned predetermined manner. Still further, the torque transmitting system can employ a dry friction clutch or a wet friction clutch which operates in a fluid medium. It is also possible to employ a torque transmitting system which constitutes a hydrokinetic torque converter.

The friction clutch 3 which is shown in FIG. 1 comprises an input section 7 receiving torque from a rotary output element (such as a camshaft or a crankshaft) of the engine 2, and an output section 8 operatively connected with the transmission 4. More specifically, the clutch 3 comprises a clutch disc or clutch plate 3a which is biased against the flywheel 3d on the output element of the engine 2 by a clutch spring 3c (such as a diaphragm spring), at least when the clutch 3 is at least partially engaged, so that a pressure plate 3b can bear upon the adjacent set of friction linings on the clutch disc or clutch plate 3a which is located between the pressure plate 3b and the flywheel 3d.

The means for partially or fully disengaging the clutch 3 comprises a bearing 3e which is movable in the axial direction of the clutch by a lever 20 receiving motion from a clutch actuating mans 13b (hereinafter called actuator for short) when the condition of the clutch is to be changed, e.g., from a fully engaged condition, through a substantial (e.g., infinite) number of intermediate or partly engaged conditions, and to a fully disengaged condition.

The clutch 3 can be designed in such a way that it is automatically adjustable to compensate for wear at least upon the friction linings of its clutch plate or clutch disc 3a. For example, the means for automatically compensating for wear at least upon the friction linings can be constructed and can operate in a manner as disclosed in commonly owned U.S. Pat. No. 5,409,091 granted Apr. 25, 1995 to Reik et al. for "AUTOMATICALLY ADJUSTABLE FRICTION CLUTCH".

The actuator 13b for the lever 20 of the clutch engaging/disengaging means receives signals from and can transmit signals to a control unit 13 which forms part of the clutch operating means and can receive signals from monitoring means including one or more sensors (such as 14, 15, 16, 17, 19a, 19b, 31, 32 and/or 41) and/or electronic or other circuits (such as 50) and/or other sources. The illustrated control unit 13 comprises an electronic (control or regulating) component 13a installed in a housing which can further confine certain constituents of the actuator 13b. FIG. 1 shows that the housing of the control unit 13 accommodates the component 13a, a driving unit (such as an electric motor or a fluid-operated motor) 12 of the actuator 13b, a gearing having at least one rotary component the speed of which is monitored by the sensor 14, and a preferably hydraulic master cylinder 11 (having a piston 11a) of a motion transmitting connection between the gearing of the actuator 13b and the lever 20. Such connection further comprises a slave cylinder 10 (having a piston rod 10a connected with the lever 20) which is connected with the master cylinder 11 by a conduit 9.

It is equally within the purview of the invention to install the actuator 13b in a discrete housing and to connect such actuator with the control unit 13 by one or more signal transmitting conductors. The control unit 13 includes or can include the power electronics and the control or regulating electronics (13a) for the driving unit 12 of the actuator 13b. The structure which is shown in FIG. 1 is preferred at this time because so many constituents can be confined in a single housing. The gearing which is monitored by the sensor 14 can comprise a worm gearing and/or a bevel gearing and/or a spur gearing which can transmit motion to the master cylinder 11, either directly, through a link train or in any other suitable manner.

The purpose of the sensor 14 is to transmit to the electronic component 13a of the control unit 13 signals denoting or being proportional to the position and/or location and/or the speed and/or the acceleration of at least one mobile part of the gearing of the actuator 13b, namely signals which are indicative of at least one relevant parameter of such gearing and hence of the condition of the master cylinder 11. The extent of axial movement and/or the axial position of the piston 11a of the master cylinder 11 determines the angular position of the lever 20 and hence the extent of engagement of the automated friction clutch 3. The illustrated connection 9-11 between the gearing of the actuator 13b and the lever 20 of the means for changing the condition (extent of engagement) of the clutch 3 can be replaced with a pneumatically operated or mechanical connection (e.g., a Bowden wire) which receives motion from the driving unit 12 by way of the gearing which is monitored by the sensor 14. Still further, and as already mentioned above, the electric motor 12 of the actuator 13b can be replaced with a fluid-operated or other suitable driving unit which is responsive to signals from the electronic component 13a of the control unit 13. Moreover, it is possible to construct the operating means for the automated friction clutch 3 in such a way that it comprises a suitable control unit and at least one magnetic actuator which serves to select the angular position of the lever 20 or an equivalent constituent of the means for varying the condition of the clutch 3.

As is well known in the relevant art, and as disclosed for example in the aforementioned U.S. Pat. No. 5,409,091 to Reik et al., transmission of torque by the clutch 3 or by an equivalent friction clutch can be regulated by changing the condition (extent of engagement) of the clutch, namely the extent of engagement between the flywheel 3d and the pressure plate 3b on the one hand, and the respective friction linings of the clutch disc 3a on the other hand. The lever 20 can constitute a fork which can change the axial position of the bearing 3e in response to axial shifting of the piston rod 10a of the slave cylinder 10 by the driving unit 12 of the actuator 13b (through the medium of the gearing which is monitored by the sensor 14 and in response to signals from the control unit 13). The lever 20 can be replaced with a centrally located clutch disengaging element, as long as the pressure plate 3b can be moved between two end positions (corresponding to the fully engaged and fully disengaged conditions of the clutch) and a plurality of intermediate positions each of which corresponds to a different partly engaged condition of the clutch. The extent to which the clutch disc 3a can slip relative to the flywheel 3d and pressure plate 3b and/or vice versa depends upon the selected axial position of the bearing 3e, i.e., upon the selected bias of the clutch spring 3c upon the pressure plate 3b.

The clutch 3 can be assembled and operated in such a way that the selected clutch torque Mk clearly exceeds the then prevailing torque Mmot of the engine 2 (e.g., a standard internal combustion engine with fuel injection into its cylinders and predetermined sequence of fuel combustion in such cylinders). If the clutch torque Mk exceeds the engine torque Mmot, the power train can damp or isolate (prevent the transmission of) irregularities (such as peaks) of torque being transmitted from the engine to the transmission 4 and thence to the driven wheels 6a.

As already mentioned above, the control unit 13 can receive signals from monitoring means including components in the form of sensors, switches, electronic circuits and/or others, and such signals are or can be evaluated, memorized and/or otherwise processed prior to transmission to the actuator 13b for the purpose of selecting the desired (optimum) condition for the clutch 3. The various components of the monitoring means can be designed to transmit to the control unit 13 signals whenever the engine 2 is on or during certain stages of utilization of the motor vehicle 1.

At least some components of the monitoring means can be connected with the control unit 13 and/or with certain other constituents, such as the electronic circuit 50 for the engine 2, the electronic circuitry for a conventional antiblock system (ABS) and/or the electronic circuitry for a standard antislip regulating system (ASR). The components of the monitoring means can be set up to transmit signals denoting the rotational speed (RPM) of one or more rotary parts (such as the RPM of the driven wheels 6a and the RPM of a rotary part (e.g., a camshaft or a crankshaft) of the engine 2), the position of a load lever (such as a gas pedal) 30, the position of the valving element (such as a pivotable flap) of a throttle valve (shown but not referenced in FIG. 1) for the engine 2, the selected gear of the transmission 4, the intention (if any) of the operator of the motor vehicle 1 to shift the transmission into a different gear and/or others.

The aforementioned sensor 14 monitors one or more parts of the adjacent gearing of the actuator 13b. The sensor 15 transmits signals denoting the position of the mobile valving element of the throttle valve for the engine 2. The sensor 16 transmits signals denoting the RPM of a rotary part of the engine 2, and the sensor 17 is or can constitute a tachometer generator which transmits signals denoting the speed of a mobile part of the differential for the axles 6 and wheels 6a, e.g., the RPM of the wheels and hence the speed of the motor vehicle 1. All of the just enumerated sensors transmit or can transmit their signals to the control unit 13 which evaluates and processes such signals or certain signals for operation of the actuator 13b, i.e., to select and control or regulate the condition of the clutch 3.

The transmission 4 is provided with a lever 18 which can be manipulated by the operator of the vehicle 1 to select and to shift the transmission 4 into or from a particular gear. The sensor 19b is designed to transmit signals denoting the intention of the operator to shift the transmission 4 into or from a particular gear (such as neutral, reverse and any one of several forward gears) and/or the momentarily selected gear. The sensor 19a can transmit signals denoting the selected gear and/or the intention by the operator to shift into or from a particular gear. For example, if the sensor 19a or 19b is designed to transmit signals denoting the operator's intention to shift the transmission 4 into a particular gear, it can be designed to respond to the magnitude and/or to the direction of application of a force by the operator for the purpose of shifting the transmission into or from a certain gear.

Alternatively, or in addition to the just outlined function, the sensor 19a and/or 19b can be designed to monitor the position and/or the distance covered by the shifting lever 18 and/or by a mobile part which is installed at the exterior or in the case of the transmission 4 and the position and/or the extent of movement and/or the direction of movement and/or the speed of movement of which is indicative of the relevant parameter or parameters of the transmission. The corresponding circuitry of the control unit 13 can be designed to evaluate the signals from the sensor 19a and/or 19b in order to ascertain (e.g., on the basis of intensity as a function of time) the intention (if any) of the operator of the vehicle 1 to shift the transmission 4 from a previously selected gear and/or into a newly selected gear.

The control unit 13 normally receives signals from all of the aforementioned sensors and other constituents of the monitoring means (either continuously or intermittently) and processes the signals to thus ensure that the condition of the clutch 3 is invariably selected in an optimum manner for the momentary or contemplated mode of transmission of torque from the engine 2, through the clutch and to the transmission 4.

The signals from the constituents of the monitoring means enable the control unit 13 to select the condition of the clutch 3 on the basis of the operating point, i.e., to control the operation of the actuator 13*b* accordingly. More specifically, signals from the control unit 13 are utilized to regulate the operation of the driving unit 12 of the actuator 13*b*. To this end, a control program in the form of hardware or software is implemented in the control unit 13 to evaluate and process the incoming signals and/or to determine the characteristics of output signals which are being transmitted to the driving unit 12 on the basis of comparison of incoming signals with each other and/or with certain functions and/or with certain characteristic fields.

In accordance with a presently preferred embodiment, the control unit 13 comprises a torque determining section or subunit, a slip determining section and/or an operating condition determining section. Alternatively, the control unit 13 can be connected to or otherwise associated with such section or sections for the transmission and/or exchange of signals. Such sections or subunits can be implemented through control programs in the form of hardware and/or software, for example, in such a manner that the incoming signals furnished by some or all of the sensors can be relied upon to determine the torque Mmot being transmitted by the engine 2, the momentary gear of the transmission 4, and the extent of slip between the friction linings of the clutch disc 3*a* on the one hand, and the friction surfaces of the flywheel 3*d* and pressure plate 3*b* on the other hand. In other words, the control unit 13 can ascertain and select the actual operating condition of the motor vehicle 1 and its power train.

The sensor 19*a* and/or 19*b* is utilized to enable the control unit 13 to ascertain the actual gear of the transmission 4. As already mentioned above, the sensor 19*a* and/or 19*b* can monitor the position of and/or the magnitude and/or the direction of forces being applied to and/or the speed of movement of the gear shifting lever 18 and/or certain other mobile part or parts (such as a central shifting rod or shaft) of the transmission 4.

The sensor 31 of FIG. 1 monitors the position of the gas pedal 30, i.e., of the means for regulating the supplying of energy (gas) to the engine 2. The sensor 32 at the gas pedal 30 can perform the function of an idling detector; for example, the sensor 32 can include or constitute a switch which is actuated only when the pedal 30 is depressed or otherwise moved, i.e., the sensor 32 represents a source of digital information denoting the condition (depression or absence of depression) of the gas pedal 30. On the other hand, the sensor 31 can be designed to monitor the extent of depression and/or other movement(s) of the gas pedal 30.

FIG. 1 further shows a brake actuating pedal 40 which is monitored by the sensor or switch 41 serving to generate signals indicating whether or not the brake (such as a pedal-operated vehicle brake and/or a manually operated parking brake) is in use. The position of the brake actuating member 40 can be monitored by more than a single sensor 41; for example, a first sensor can be provided for the pedal-operated vehicle brake and a discrete second sensor can be provided for the parking brake. The illustrated component 41 of the monitoring means can constitute a digital switch-type sensor which simply indicates whether or not the brake or brakes controlled by the member 40 is or are in use. Furthermore, the sensor 41 can include or control a signal generating device, such as a lamp, which lights up and/or generates another detectable signal when the brake or brakes is or are actuated and/or when the actuation of the brake or brakes is interrupted. However, it is equally possible to employ an analog sensor 41, e.g., a potentiometer which can indicate whether or not the brake(s) is or are being actuated as well as the extent of actuation of such brake(s). The analog sensor or sensors, too, can be designed to operate or to embody a device for the generation of visible and/or otherwise detectable signals.

In order to set the motor vehicle 1 in motion, or to accelerate a creeping or crawling vehicle (namely a vehicle which advances at a negligible or minimal speed), i.e., to initiate a planned operator-induced acceleration of the vehicle, the operator normally actuates only the gas pedal 30 which initiates a controlled engagement or further engagement of the automated clutch 3 through the operating means including the control unit 13 and the actuator 13*b*. Thus, the sensor 31 transmits a signal which is detected by the control unit 13 as an indication of the operator's desire for a relatively slow or further acceleration of the vehicle 1. Thus, an actuation (such as depression) of the gas pedal 30 and the resulting transmission of a corresponding or commensurate signal by the sensor 31 are parameters which are processed by the control unit 13 in order to ensure a corresponding adjustment of the automated clutch 3 via actuator 13*b*.

At least in many instances, the control unit 13 can basically regulate the changes of the condition (extent of engagement) of the clutch 3 (i.e., the starting torque Mksoll to be transmitted by the clutch) in accordance with a predetermined or predeterminable function and/or on the basis of characteristic curves or characteristic fields, for example, in dependency upon the RPM of a rotary part of the engine 2. It is often preferred to realize the dependency upon the RPM of the engine and/or upon other parameters (such as the engine torque Mmot) by way of a characteristic field or a characteristic curve.

For example, if the vehicle 1 is to be accelerated practically from stillstand or while crawling at a very low speed by depressing or pivoting the gas pedal 30 through a certain angle a, the electronic circuit 50 for the engine 2 receives an appropriate signal from the sensor 31 and/or 32 and selects an appropriate rotational speed and appropriate torque Mmot for the engine. The sensor 31 and/or 32 further transits one or more signals to the control unit 13 which causes the actuator 13*b* to select an appropriate torque Mk for the automated friction clutch 3, e.g., in accordance with one or more preselected or preselectable functions and/or characteristic fields to thus establish a state of stationary equilibrium between the selected engine torque Mmot and the selected clutch torque Mk, all in dependency upon or as a result of the selected position (angle α) of the gas pedal 30. The clutch 3 drives the transmission 4 which rotates the wheels 6*a* via differential and thereupon by way of the axles 6. In the following passages of this specification, the functional relationship between the starting torque as a function of the starting RPM will be referred to as a "characteristic starting curve". The angle α of the gas pedal 30 is proportional to the position of the mobile valving element (such as a pivotable flap) of the throttle valve (refer to the sensor 15).

The electronic circuit 50 determines the torque Mmot of the engine 2 by regulating, for example, the rate of fuel admission, the duration of the intervals of fuel injection, the position (angle) of the mobile valving element of the throttle valve and/or other parameters. This circuit 50 is preferably connected with one or more other components of the power train, such as with the control unit 13. For example, the circuit 50 can embody means for calculating or determining the actual torque Mmot of the engine 2 on the basis of incoming signals (such as from the sensor 31 and/or 32 and/or from the circuit 13a). The arrangement can be such that the circuit 50 ascertains or determines the optimum torque Mmot of the engine 2 on the basis of the RPM of the camshaft or crankshaft of the engine, the position of the mobile valving element of the throttle valve and (if needed) certain further parameters, and transmits to other parts (e.g., to the electronic component 13a) signals denoting the thus determined torque Mmot.

Figure 2:
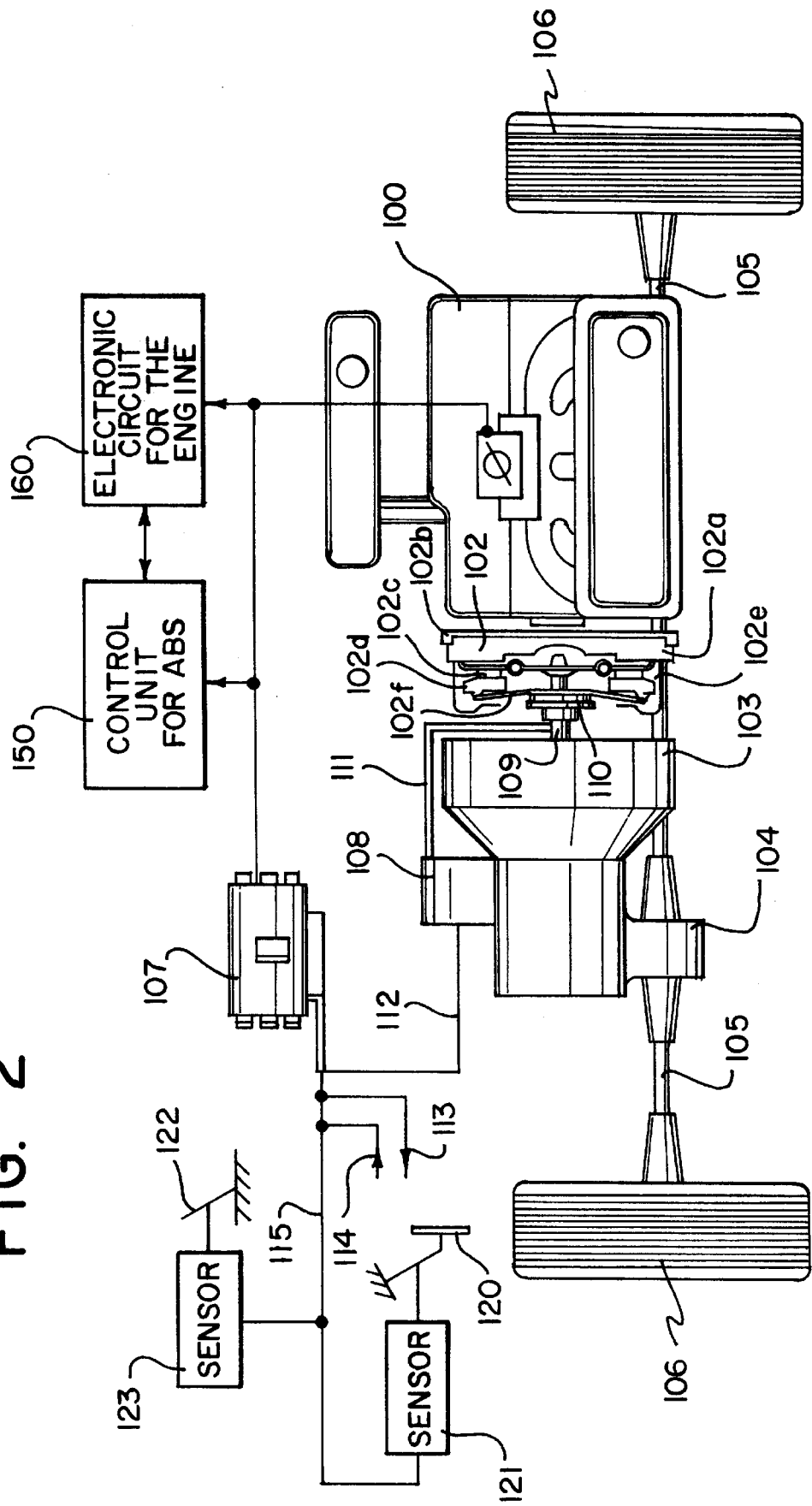
FIG. 2 is a schematic plan view of a modified power train.

FIG. 2 shows schematically the power train of a motor vehicle, such as a passenger car, a van or a truck. The power train comprises a prime mover 100 (such as an internal combustion engine and hereinafter referred to as engine for short), an automated torque transmitting system 102 (such as a friction clutch and hereinafter called clutch for short) which receives torque from a rotary output element (such as a camshaft or a crankshaft) of the engine 100, an automated transmission system 103 (hereinafter called transmission for short) having an input element receiving torque from the clutch 102, a differential 104 driven by the transmission 103, axles 105 driven by the differential 104, and driven wheels 106 receiving torque from the axles 105.

The clutch 102 includes an input element 102a (such as a flywheel) which receives torque from the output element of the engine 100 and which carries the other components of the clutch. Such components include a starter gear 102b (e.g., a spur gear) which is shown as being affixed directly to or as forming part of the flywheel 102a, a housing or cover 102e which is coaxial and rotates with the flywheel 102a, a pressure plate 102d which rotates with but is movable axially (within limits) in the interior of the housing. 102e, and, a clutch spring 102f (such as a diahragm spring) which is pivotably mounted in and reacts against the housing 102e to bear against a clutch disc or clutch plate 102c when the clutch 102 is at least partially engaged; at such time, the pressure plate 102d bears (with or without slip) against one set of friction linings on the clutch disc 102c and the other set of friction linings is urged (with or without slip) against the adjacent friction surface of the flywheel 102a. The clutch disc 102d may be provided with a damper, e.g., a damper of the type disclosed in U.S. Pat. No. 5,161,660 granted Nov. 10, 1992 to Huber for "CLUTCH PLATE WITH PLURAL DAMPERS".

The condition of the automated friction clutch 102 can be changed by an axially movable bearing 110 which can be moved by a centrally located axially movable disengaging member 109. The bearing 110 can be caused to depress or to pull the tips or free ends of radially inwardly extending prongs or tongues forming part of the clutch spring 102f to change the bias of the spring 102f upon the pressure plate 102d. The member 109 can be acted upon by a fluid-operated arrangement such as that including the cylinders 10, 11 and the conduit 9 of FIG. 1.

The illustrated clutch 102 is a push-type clutch, i.e., it can be disengaged in response to depression of the bearing 110 toward the flywheel 102a. However, such push-type clutch can be replaced with a so-called pull-type clutch wherein the tips of prongs forming part of the clutch spring must be moved away from the flywheel in order to cause such clutch to assume its disengaged condition in which Mk=0.

The reference character 108 denotes an actuating means (actuator) of the means for operating the automated transmission 103. The driving unit or units (e.g., one or more electric motors or fluid-operated motors) of the actuator 108 can transmit motion to one or more internal components of the transmission 103, for example, to a gear shifting sleeve, one or more gear shifting rods or a central gear shifting shaft. The transmission 103 of FIG. 2 can be of the type which is shiftable into or from a selected gear in a predetermined sequence or directly from a previously active gear into any newly selected gear.

The connection 111 between the actuator 108 for the automated transmission 103 and the aforementioned disengaging member 109 for the automated clutch 102 can constitute a fluid-operated (such as hydraulic or pneumatic) or a mechanical connection.

The means for operating the automated clutch 102 and the automated transmission 103 further comprises a control unit 107 which is connected with the actuator 108 by signal transmitting conductor means 112. Additional conductors 113, 114, 115 are provided to transmit signals to and/or from the control unit 107. For example, the conductor 114 can be used to transmit signals to the control unit 107, and the conductor 113 can transmit signals which were processed by the control unit 107. The conductor 115 can include a data bus which can establish a connection between the control unit 107 and one or more electronic and/or other constituents of the power train shown in FIG. 2.

FIG. 2 further shows a load lever 122 (such as a gas pedal) which cooperates with a sensor 123 serving to transmit (via conductor 115) signals denoting the position of the pedal or lever 122, i.e., the rate of fuel admission to the engine 100. A brake actuating member 120 is associated with at least one sensor 121 serving to transmit (via conductor 115, such as a cable) signals denoting the condition of a vehicle brake and/or a parking brake. The member 120 can be a brake pedal or a hand-operated lever or handle. For example, the illustrated single sensor 121 can constitute a digital sensor (such as a switch) which is designed to transmit signals denoting whether or not the brake(s) is or are being actuated. Furthermore, the sensor 121 can embody or can cooperate with one or more devices (such as lamps) for the generation of visually and/or otherwise detectable signals indicating the position and/or condition of the associated brake or brakes. For example, discrete lamps can be provided to indicate the condition of a pedal-operated vehicle brake and a manually operated parking brake.

Alternatively, the sensor 121 can constitute an analog sensor, such as a potentiometer, which serves to transmit signals denoting the extent of actuation (e.g., pivoting or depression) of the member 120. Such analog sensor can also embody or cooperate with means for generating visually and/or otherwise detectable signals for the operator of the motor vehicle.

The power train of FIG. 2 can employ a manually shiftable transmission system in lieu of the illustrated automated transmission 103. Still further, and as already mentioned in connection with the power train in the motor vehicle 1 of FIG. 1, the transmission between the clutch 102 and the differential 104 of the power train 102 shown in FIG. 2 can constitute an infinitely variable speed transmission (e.g., of the type disclosed in U.S. Pat. No. 5,169,365 to Friedmann) or any other suitable manually shiftable or automated transmission.

The RPM of the engine 100 (for example, preparatory to setting of the motor vehicle in motion) can be selected as a function of the angle of the mobile valving element of the throttle valve (shown but not referenced in FIG. 2), as a function of the engine torque Mmot and/or the RPM of a rotary component part of the engine as well as a function of time.

The electronic circuit 160 for the engine 100 selects the engine RPM and/or the engine torque Mmot. In addition, the electronic circuit 160 can be designed to ascertain the actual engine torque on the basis of certain parameters of the engine. As shown, the system 160 is connected with the control unit 107 for the actuator 108 as well as with the control unit 150 of an antiblock system (ABS) and/or with a traction control arrangement and/or with an antislip regulator (ASR).

Figure 3:
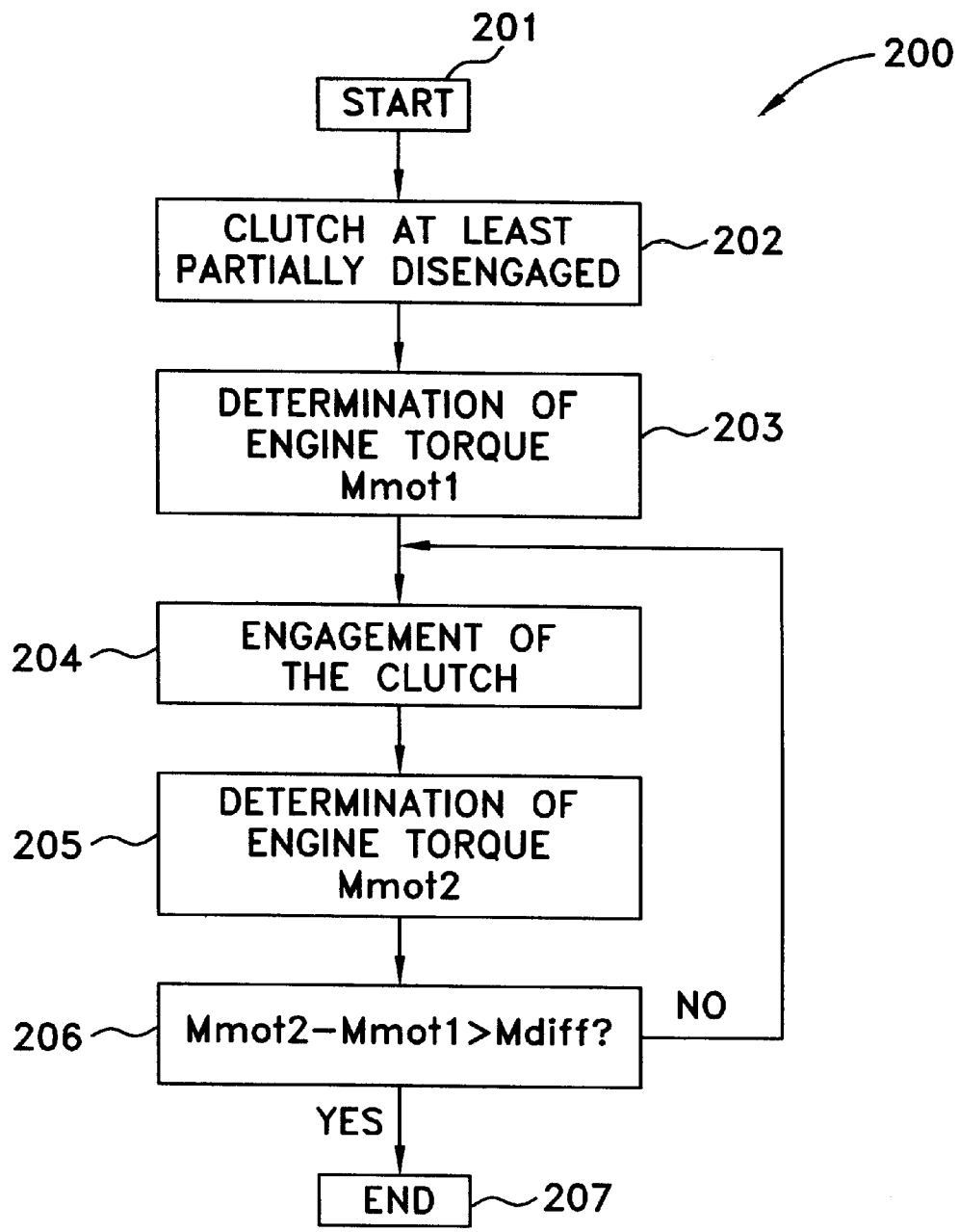
FIG. 3 is a diagram with blocks denoting the steps of one embodiment of the improved method.

The block diagram 200 of FIG. 3 is illustrative of one mode of controlling or regulating the operation of a power train in a motor vehicle in accordance with the method of the present invention, namely to regulate the creeping or crawling movements of the motor vehicle. The block 201 denotes the initiation and start of the crawling movement. Such movement can begin when the brake(s) is or are not engaged, the transmission (4 or 103) is in gear, the engine (2 or 100) is running, and the gas pedal (30 or 122) is not actuated. The crawling movement is initiated when the control unit 13 or 107 ascertains the just outlined condition of the motor vehicle.

Prior to or during actual start of the crawling movement, the clutch 3 or 102 is at least substantially disengaged (note the block 202 in the diagram 200 of FIG. 3), i.e., the magnitude of the torque Mk being transmitted by the clutch is essentially zero. The block 203 denotes the step of determining the engine torque Mmot1 while the torque Mk is at least close to zero, the brake(s) is or are disengaged, the engine is running, and so forth. The block 204 is representative of the step of increasing the transmission of torque Mk (i.e., the extent of engagement) of the friction clutch; thus, the clutch is at least partly engaged. The next block 205 denotes the step of ascertaining the engine torque Mmot2 subsequent to the at least partial engagement of the clutch (as denoted by the block 204), and the block 206 represents the determination (by the control unit 13 or 107) of the difference Mmot2−Mmot1. This block 206 denotes the step of comparing the difference Mmot2−Mmot1 with a predetermined or predeterminable comparison value Mdiff. For example, the comparison at 206 should indicate whether or not Mmot2−Mmot1>Mdiff.

If the difference Mmot2−Mmot1 is greater than the selected value of Mdiff, this indicates that the torque Mk which can then be transmitted by the partly engaged clutch suffices to ensure that the vehicle will carry out a crawling movement. The routine is terminated at 207 after elapse of the interval which is contemplated for the performance of the crawling movement. If the difference Mmot2−Mmot1 is less than Mdiff, the extent of engagement of the clutch (block 204) is increased (i.e., Mk is increased), and the steps 205, 206 are repeated.

The engine torque Mmot can be relied upon, by regulation of idling of the engine, as an indication of the crawling torque. Thus, the load upon the engine increases as a result of regulation of idling while the clutch is at least partly engaged, and the regulation of idling entails an increase of engine torque substantially to an extent corresponding to the extent of increased load.

Figure 4:
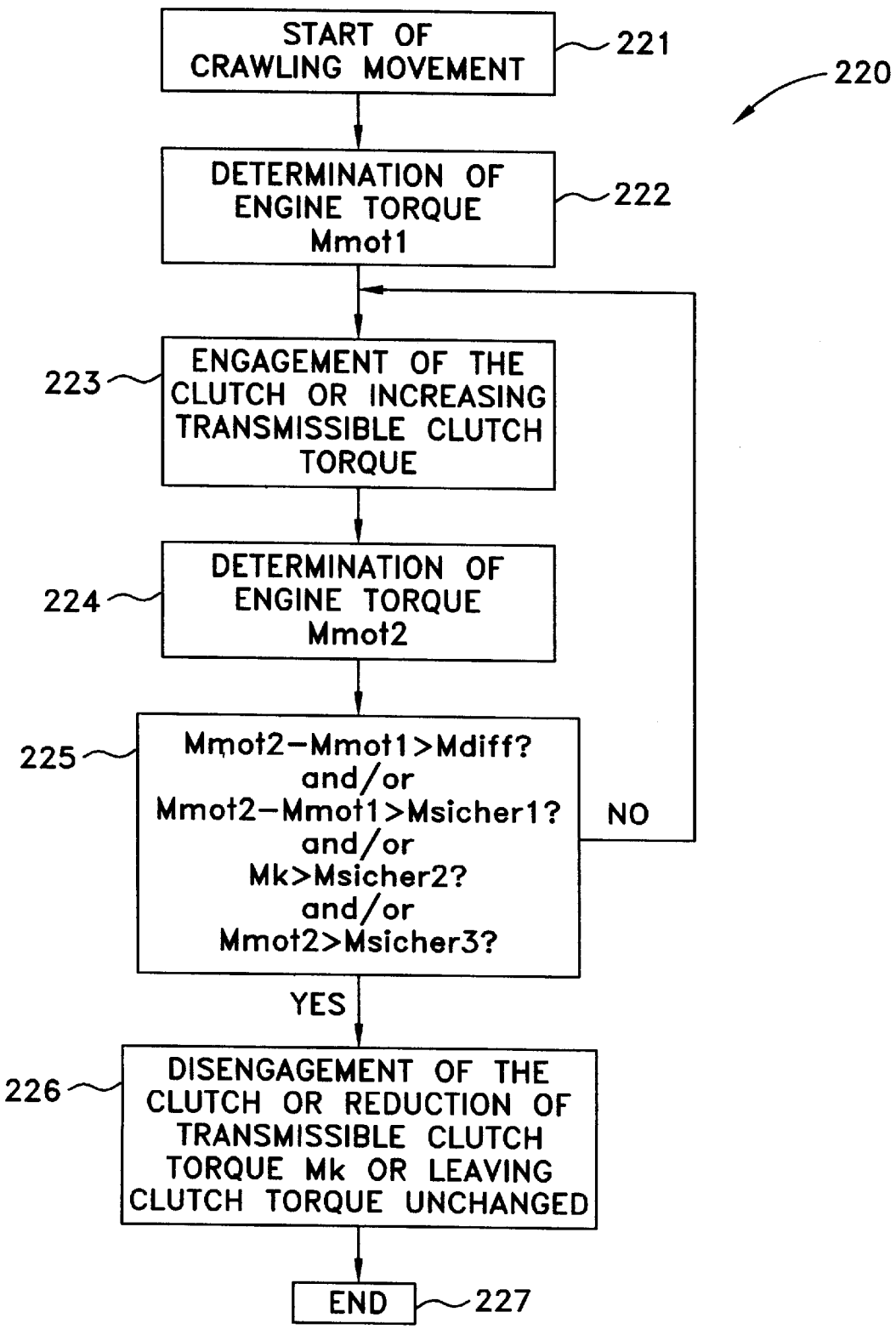
FIG. 4 is a diagram with blocks denoting the steps of a modified method.

The block diagram 220 of FIG. 4 denotes the steps of a modified method. The block 221 represents the initiation of a crawling movement under the circumstances outlined in connection with the block 201 in the diagram 200 of FIG. 3. The block 222 represents the step of ascertaining the engine torque Mmot1 while the clutch is at least substantially disengaged and while the magnitude of the torque being transmitted or being transmittable by the clutch is negligible. The next step (block 223) represents the step of increasing the clutch torque Mk, namely from zero to a certain value or from a lower value to a higher value, and the next-following step (block 224) involves a determination of the changed engine torque Mmot2, i.e., of the torque Mmot2 which is furnished by the engine 2 or 100 while the clutch 3 or 102 is at least slightly engaged.

The block 225 represents the step of ascertaining the difference between the engine torques Mmot2 and Mmot1 as well as a comparison between Mmot2−Mmot1 and Mdiff. Alternatively, or in addition to the just outlined comparison, the step denoted by the block 225 can involve a determination whether or not the difference Mmot2 Mmot1 exceeds a preselectable safety value Msicher of the torque. For example, such comparison with Msicher can take place in response (subsequent) to a determination that Mmot2−Mmot1>Mdiff. If the first comparison indicates that Mmot2−Mmot1>Mdiff, the next comparison can ascertain whether or not Mmot2−Mmot1<Msicher and/or whether or not Mmot2<Msicher. of course, the control unit 13 or 107 can be designed to carry out the aforementioned comparisons (namely Mmot2−Mmot1>Mdiff, Mmot2 Mmot1<Msicher, and Mmot2<Msicher) independently of each other, i.e., regardless of whether Mmot2−Mmot1 is greater or less than Mdiff.

For example, Msicher can be selected to be between 20 and 50 Nm, and the torque which is to be selected for the crawling movement can be in the range of 3 to 20 Nm, preferably between 7 and 15 Nm.

The block 225 in the diagram 220 of FIG. 4 further shows that one can operate with up to three different values (Msicher1, Msicher2 and Msicher3) of safety torque. If at least the first comparison (namely whether Mmot2−Mmot1 is greater than Mdiff) is answered in the negative, and/or if the second comparison (namely whether or not Mmot2−Mmot1 is greater than Msicher1) is answered in the negative, and/or if the third comparison (namely whether or not Mmot2 is greater than Msicher2) is answered in the negative, and/or if the fourth comparison (namely whether or not Mmot2 is greater than Msicher3) is answered in the negative, the next step involves further engagement of the clutch (block 223) to thus increase the torque Mk which can be transmitted by the clutch 3 or 102.

If the first comparison (whether or not Mmot2 −Mmot1 is greater than Mdiff) is answered in the affirmative, the condition (i.e., the extent of engagement) of the clutch can remain unchanged. It is also possible to design the control unit 13 or 107 in such a way that, when the difference Mmot2−Mmot1 reaches a threshold value, the transmissible clutch torque Mk is changed by a preselectable predetermined value, such as a factor or an addend.

If at least one of the above-enumerated comparisons is answered in the positive, the prevailing clutch torque Mk can remain unchanged, it can be reduced to a certain extent, or it can be reduced to zero (note the block 226). The block 227 denotes the termination of the routine. The just described sequence of steps can be carried out during each basic cycle.

Figure 5:
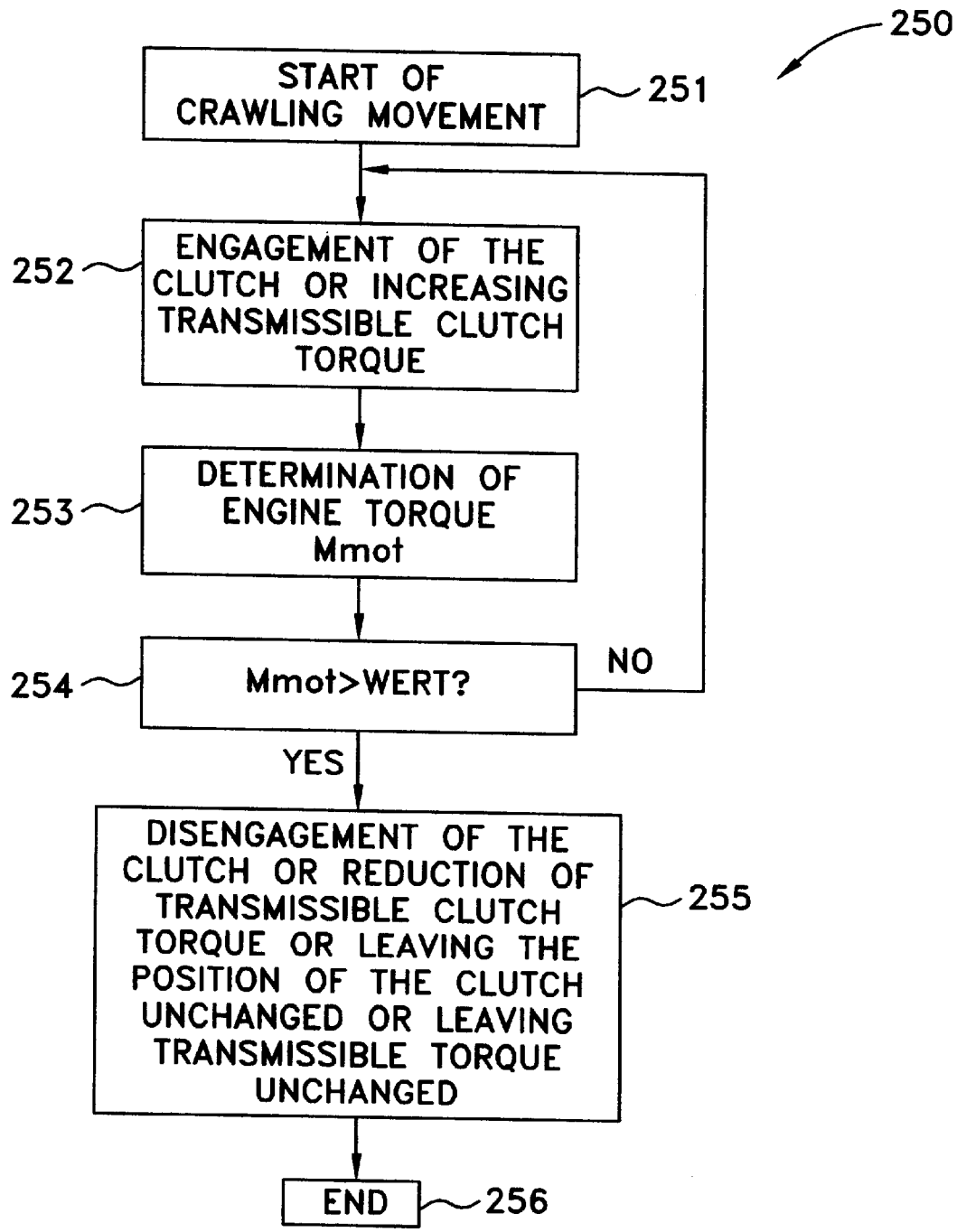
FIG. 5 is a diagram with blocks denoting the steps of a third embodiment of the improved method.

FIG. 5 shows a block diagram 250. The topmost block 251 indicates the start of the crawling operation, for example, under circumstances as outlined in connection with the block 201 in the diagram 200 of FIG. 3, and in response to the generation of an initiation signal. The next step (denoted by the block 252) involves an engagement of the clutch 3 or 102, or a further engagement of the clutch, and this step is followed by a selection or ascertainment of the engine torque Mmot (block 253). The next-following step (denoted by the block 254) involves a comprison of the ascertained or selected engine torque Mmot with a reference value WERT. If Mmot is less than WERT, the step 252 is repeated, i.e., the engagement of the clutch is increased. On the other hand, if Mmot is greater than WERT, the clutch is at least partially disengaged (block 255) or the transmissible clutch torque Mk is reduced or the condition of the clutch remains unchanged or the torque Mk remains unchanged. The procedure for the actual basic cycle is terminated at 256.

Figure 6:
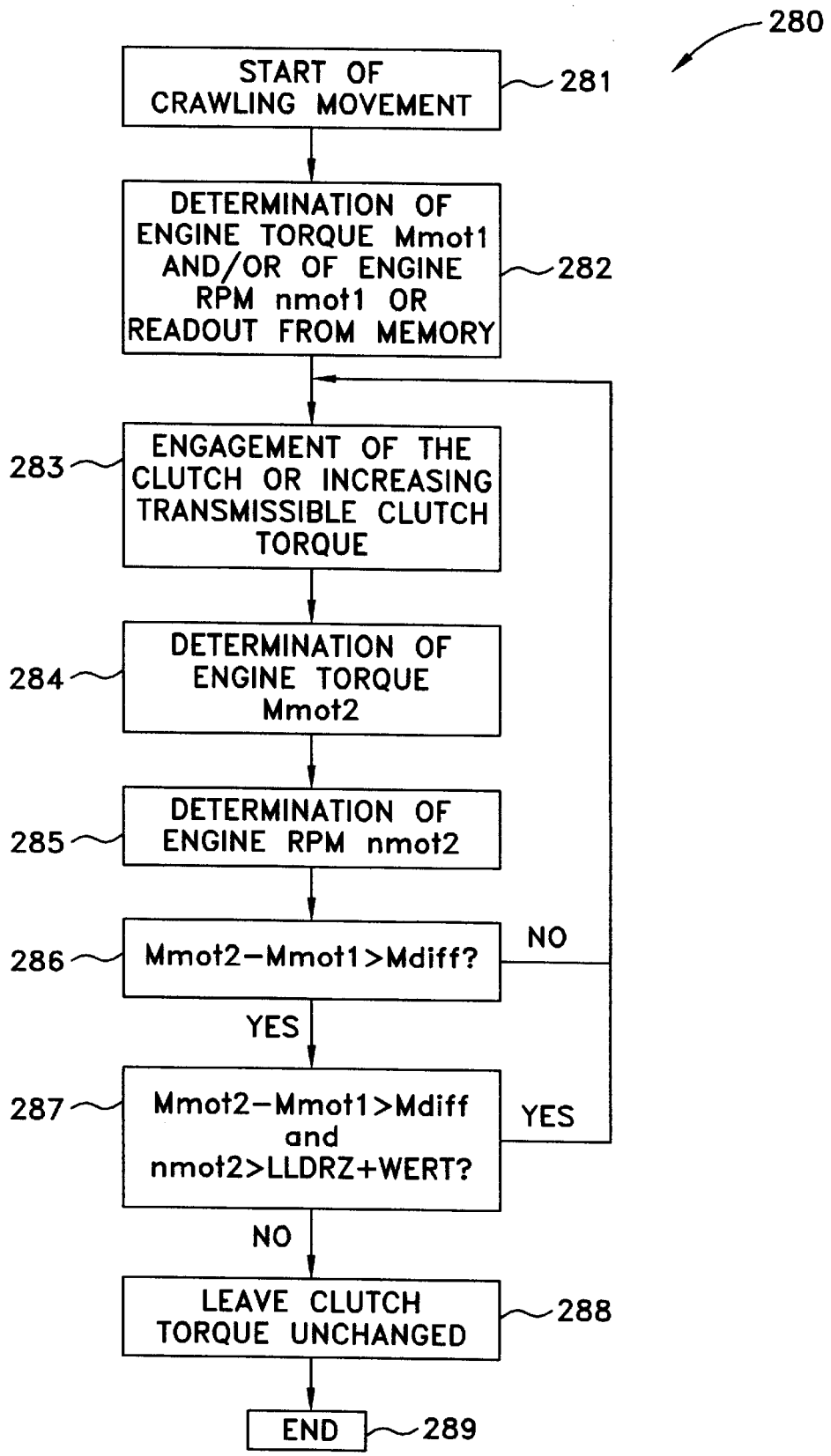
FIG. 6 is a diagram with blocks denoting a fourth embodiment of the improved method.

Referring to FIG. 6, there is shown a further block diagram 280 with blocks representing a different sequence of steps in connection with the initiation of a crawling operation. The operation is or can be initiated (block 281) in the same way as described with reference to the block 201 in the diagram 200 of FIG. 3. The next block 282 denotes the step of ascertaining the engine torque Mmot1 and/or the engine RPM nmot1 while the clutch is at least substantially disengaged. It is also possible to ascertain the value Mmot1 and/or nmot1 prior to the step which is denoted by the block 282 or continuously, and to store the thus obtained information in a memory of the control unit 13 or 107 in such a way that the memorized information can be addressed and recovered, when necessary. It is advisable to ascertain the engine torque Mmot1 and/or the engine RPM nmot1 while the clutch is at least substantially disengaged, for example, when the clutch does not transmit any torque and the detected values of engine torque are filtered or averaged. This renders it possible to achieve a continuous actualization of the memory and an at least basically correct or accurate averaged or filtered engine torque value and/or engine RPM value is available during such phases or stages.

For example, if a filter is being utilized, one can employ a PT1 filter. If the clutch is thereafter engaged, at least in part so that it transmits a torque Mk, the last ascertained value of the engine torque can remain stored in the memory and is available for readout. The value of the engine RPM can be an idling RPM value LLDRZ.

The block 283 in the diagram 280 of FIG. 6 denotes an at least partial engagement of the clutch or an increase of the torque which can be transmitted by the clutch. The next step (block 284) involves a detection or determination of the engine torque Mmot2 while the clutch is at least partly engaged, and the next-following step (block 285) denotes the step of detecting or determining the engine RPM nmot2.

The block 286 is representative of the step of ascertaining the difference Mmot2−Mmot1 and the comparison of such difference with the value Mdiff. If the value of Mmot2−Mmot1 is less than Mdiff, the steps denoted by the blocks 283 to 286 are repeated but the engagement of the clutch, i.e., the ability of the clutch to transmit torque (block 283), is increased. If the comparison denoted by the block 286 indicates that the difference Mmot2−Mmot1 is greater than Mdiff, the next step (block 287) includes a comparison of nmot2 with, for example, LLDRZ+WERT, i.e., with a preselectable threshold value represented by the sum of LLDRZ and WERT (namely the sum of idling RPM=LLDRZ plus the preselectable addend WERT. Alternatively, the block 287 can denote a comparison of nmot2 with LLDRZ in order to ascertain whether or not nmot2 exceeds LLDRZ by the value of WERT.

If the steps denoted by the block 287 indicate that the difference Mmot2−Mmot1 is greater than Mdiff, and that nmot2 is greater than LLDRZ+WERT, the extent of engagement of the clutch (block 283) is also increased. On the other hand, if the difference Mmot2−Mmot1 exceeds Mdiff but nmot2 is less than LLDRZ+WERT, the clutch torque remains unchanged (see the block 288) and the proceeding is terminated at 289 upon completion of the basic cycle. It is also possible to proceed, under certain circumstances, upon completion of the step denoted by the block 284.

As used herein, the term "clutch torque" or "torque transmissible by the automated torque transmitting system" is intended to denote the torque Mk which can be transmitted by the clutch 3 or 102, which can be selected by the actuator 13b or 108, and which is the maximum torque transmissible by the clutch at a given instant of time (independently of the torque Mmot being then transmitted by the engine 2 or 100). In accordance with another selection or setting of the clutch torque in dependency upon the increasing engine (prime mover) torque, it is of advantage to ensure that a predeterminable torque Mk is being transmitted irrespective of the operating point of the clutch, i.e., irrespective of the exact locus of partial engagement of the clutch when the latter begins to transmit torque while its condition is being changed by the actuator 13b or 108 from a fully disengaged condition toward a fully engaged condition. The same holds true for any changes in the characteristics of the automated clutch other than its operating point (of initial engagement). This ensures that the operating means including the control unit 13 or 107 and the actuator 13b or 108 can always select for the automated clutch a partly engaged condition in which the characteristics of the creeping or crawling movement of the motor vehicle remain unaffected by a shift of the operating point and/or by changes of other characteristics of the clutch and/or of the prime mover during the entire useful life of the power train.

The idling regulator (in the circuit 50 or 60) for the engine 2 or 100 ensures that, when engine is idling (i.e., when the gas pedal 30 or 122 is not depressed), the torque Mmot of the engine can be increased by a value which is proportional to an increase of the load upon the motor vehicle. The load is the controlled clutch torque Mk, i.e., the torque Mmot increases as a function of the extent of the selected clutch torque Mk.

The above outlined construction of the improved power train ensures that the clutch torque Mk which is selected to achieve a desirable creeping or crawling movement of the motor vehicle is invariably related to (i.e., properly dependent upon) the engine torque Mmot and/or an increase of Mmot. This ensures that the torque during creeping or crawling movement remains at least substantially unchanged, even if the creeping or crawling movements are induced under widely different circumstances, i.e., in different conditions or stages of operation or adjustment of one or more component parts of the power train. It can be of particular advantage if an increase of Mmot is determinable by the difference Mmot2−Mmot1 wherein Mmot1 denotes the engine torque prior to start of the crawling movement and Mmot2 denotes the prime mover torque during initiation of the crawling movement, e.g., by shifting the transmission 4 or 103 into a forward gear.

Alternatively, the power train can be designed in such a way that the engine torque Mmot1 is ascertained while the clutch is disengaged, the brake(s) is or are not applied and the gas pedal is not depressed. The clutch is thereupon at least partially engaged on shifting of the transmission into gear, i.e., the clutch assumes a condition which causes the torque Mk to rise from a first value to a second value as long as the monitored engine torque Mmot2 does not reach a predeterminable value with respect to the engine torque Mmot1.

If the crawling movement is terminated, e.g., in response to the engagement of a brake, the transmissible clutch torque Mk can be reduced to a predeterminable value as a function of time. The torque Mk can be reduced to a predeterminable value at which Mmot2−Mmot1=0. Alternatively, the torque Mk can be reduced in such a way that the clutch assumes a condition of partial engagement corresponding to the operating point or to a point at a predetermined distance from (i.e., in a predetermined relationship with) the operating point. The reduction of torque Mk can be achieved by resorting to single-stage or multi-stage functions or ramps, e.g., in such a way that the actual value of Mk is always reduced at the same speed or within a given interval of time or at different rates depending upon the operating point. If the torque Mk is reduced in dependency on the operating point, one can rely, for example, on the engine RPM nmot, on the engine torque Mmot, the speed of the motor vehicle and/or upon other parameters as values which determine the rate of a reduction of torque Mk and/or the speed of such reduction.

It can be of advantage to regulate the torque Mk in such a way that a preselectable vehicle speed is not exceeded even if, for example, the maximum permissible torque which can be transmitted by the clutch and/or a maximum increase of engine torque Mmot is not reached. This ensures that a velocity-regulated crawling movement of a motor vehicle can be reached with a power train which employs an automated torque transmitting system. Such object can be radily achieved, for example, by utilizing the control unit as a means for ascertaining the velocity of the vehicle on the basis of the RPM of the wheels and/or on the basis of other information; a signal denoting the speed of the vehicle is compared with a predeterminable value which denotes the desired vehicle speed during crawling. For example, if the velocity of the motor vehicle is controlled by regulating or controlling the transmissible torque during crawling, one can nevertheless realize a limitation of the maximum engine torque Mmot and/or of the maximum clutch torque Mk as long as the actual velocity of the vehicle is below a desired velocity.

By increasing the value of clutch torque Mk in the course of a crawling movement, the idling regulator can increase the value of the engine torque Mmot to thus increase the speed of the motor vehicle. These three values (namely Mk, Mmot and the speed of the vehicle) can be processed in such a way that there exist maximal or optimum conditions for an increase of Mmot, for Mmot, for the transmissible Mk and/or for the velocity of the motor vehicle. If at least one of these maximum values is reached, the torque Mk can remain unchanged or such torque can be reduced, e.g., all the way to zero.

Figure 7:
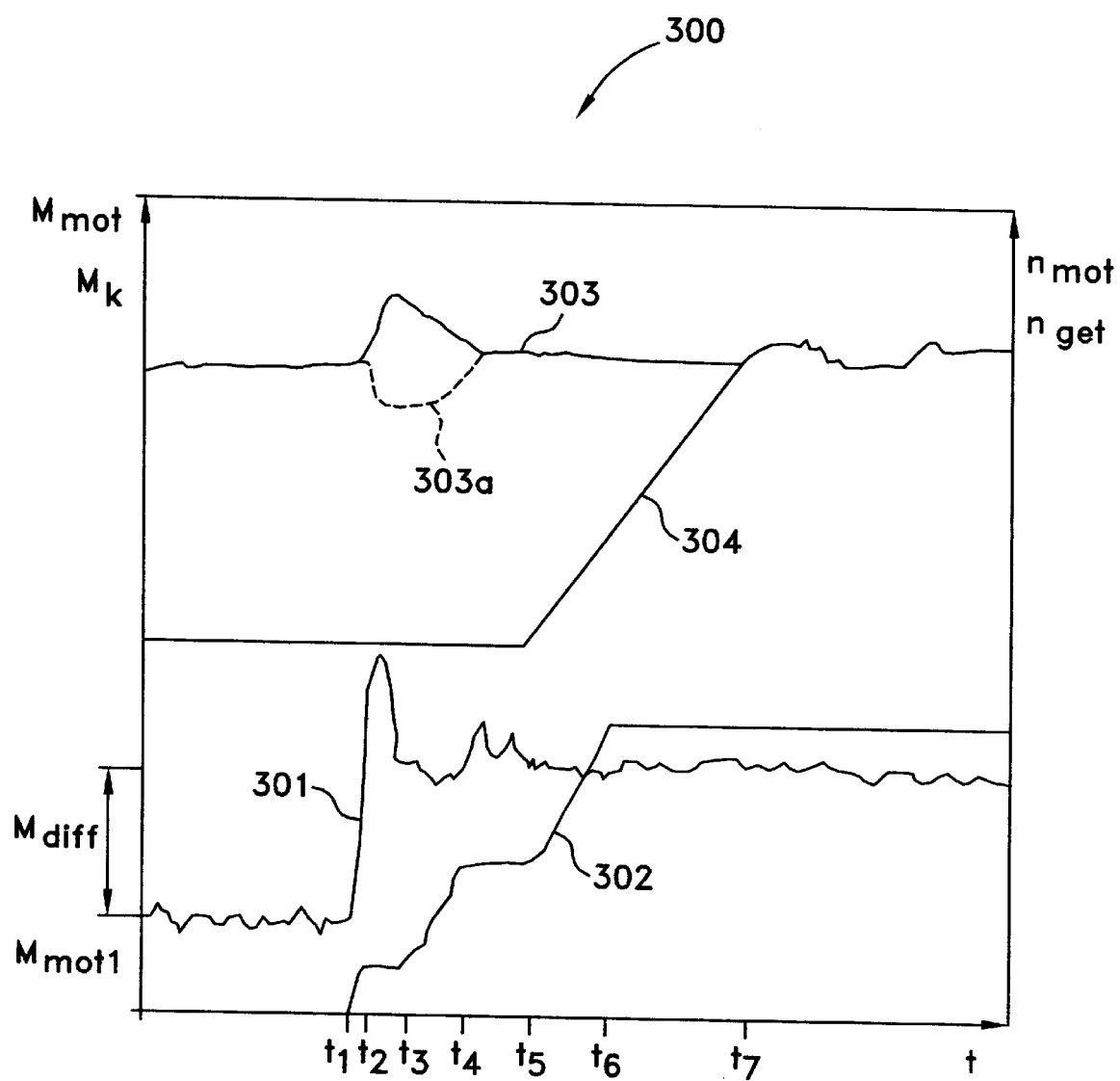
FIG. 7 is a coordinate system wherein the curves denote a first relationship between the torque being transmitted by the prime mover of the vehicle, the torque being transmitted by the automated torque transmitting system of the power train, the RPM of the prime mover, and the RPM of an input element of the transmission.

FIG. 7 shows a coordinate system 300 wherein torques M are measured along the ordinate and the time t is measured along the abscissa. The curve 301 denotes the progress of the engine torque Mmot, the progress of the transmissible clutch torque Mk is represented by the curve 302, the progress of the engine RPM nmot is denoted by the curve 303, and the progress of the transmission input RPM nget is indicated at 304, all as a function of time t.

No crawling or creeping movement of the motor vehicle is initiated prior to the elapse of a time interval from zero to the instant t1; at such instant, the torque Mk which is transmissible by the clutch (curve 302) is increased, and the engine torque Mmot (curve 301) is also increased.

It is preferred to increase the engine torque Mmot when the crawling movement begins; for example, the engine torque can be increased by a value corresponding to that by which the idling speed regulator would increase the engine torque as a result of the load imposed due to partial engagement of the clutch. Reference may also be had to German patent application Serial No. 196 21 106.

In accordance with a modification, it might be of advantage not to effect a controlled increase of engine torque Mmot at the start of the crawling movement but rather by way of the idling regulator when the load upon the engine is increased.

During the interval between the instants t1 and t2, the difference Mmot−Mmot1 between such engine torques is less than Mdiff. During this same interval (between t1 and t2), the selected transmissible clutch torque Mk increases (note the relevant portion of the curve 302). During the interval between the instants t2 and t3, the difference Mmot−Mmot1 is greater than Mdiff, and the transmissible clutch torque Mk (curve 302) undergoes an additional increase. The difference Mmot−Mmot1 is less than Mdiff during the interval between the instants t3 and t4, and the magnitude of transmissible clutch torque Mk undergoes a further increase (note the relevant portion of the curve 302).

The transmissible clutch torque Mk (curve 302) does not increase during the interval between the instants t4 and t5 because the difference Mmot−Mmot1 is greater than Mdiff. During the next interval between the instants t5 and t6, the difference Mmot−Mmot1 is less than Mdiff, and the transmissible clutch torque Mk (curve 302) is increased. No further increase of clutch torque Mk (curve 302) takes place during the interval starting at the instant t6.

The curve 303 indicates that the engine RPM nmot reaches a maximum value during the interval between the instants t1 and t4 substantially simultaneously with the controlled rise of the engine torque (curve 301) to a maximum value. If the engine torque were to be increased by way of the idling regulator, the engine RPM would undergo an at least slight decrease during the interval between the instants t1 and t4 (as indicated at 303a).

The coordinate system of FIG. 7 shows that the transmission RPM nget (curve 304) begins to rise basically from the instant t5 on. From the instant t5, the torque Mk which can be transmitted by the clutch (curve 302) and the transmitted engine torque Mmot (curve 301) suffice to maintain the motor vehicle in motion. The synchronization point is reached at or beyond the instant t7 and the engine RPM nmot (curve 303) matches or closely approximates the transmission RPM Inget (curve 304).

That selected torque Mk which can be transmitted by the clutch 3 or 102 increases during those intervals when the difference Mmot−Mmot1 is less than Mdiff. On the other hand, the torque which can be transmitted by the clutch does not rise during those intervals when the torque Mmot exceeds Mdiff+Mmot1.

In the coordinate system 400 of FIG. 8, the torque M is again measured along the ordinate and the time t is measured along the abscissa. The curve 401 represents the variations of engine torque Mmot, the curve 402 denotes variations of the transmissible clutch torque Mk, the curve 403 denotes the variations of the engine RPM nmot, and the curve 404 denotes variations of the transmission RPM nget, all as a function of time t.

No creeping or crawling movement takes place during the interval up to the instant t1; such movement is initiated at the instant t1 when the torque Mk (curve 402) which can be transmitted by the clutch increases and the engine torque Mmot (curve 401) also increases.

During the interval between the instants t1 and t2, the difference Mmot−Mmot1 is less than Mdiff and the selected transmissible clutch torque Mk (curve 402) increases. At the instant t2, the difference Mmot−Mmot1 rises above Mdiff and the transmissible clutch torque Mk (curve 402) continues to increase to the instant t3. The torque Mk (curve 402) does not increase during the interval between t3 and t4. It will be seen that Mk (curve 402) begins to increase again after the engine RPM nmot (curve 403) rises above the idling RPM (LLDRZ) plus Δ. From then on, the transmissible clutch torque Mk begins to increase again. The difference Mmot−Mmot1 exceeds the value of Mdiff during the interval between the instants t3 and t4, and the clutch torque Mk (curve 402) does not continue to increase. However, the difference Mmot−Mmot1 becomes less than Mdiff during the interval following the instant t4 and ending at the instant t5, and the torque Mk (curve 402) rises again. The magnitude of Mk (curve 402) remains unchanged during the interval following the instant t5.

The curve 403 (denoting the engine RPM nmot) indicates that the controlled rise of engine torque Mmot reaches its peak simultaneously with a rise of the engine RPM nmot to its peak value.

Figure 8:
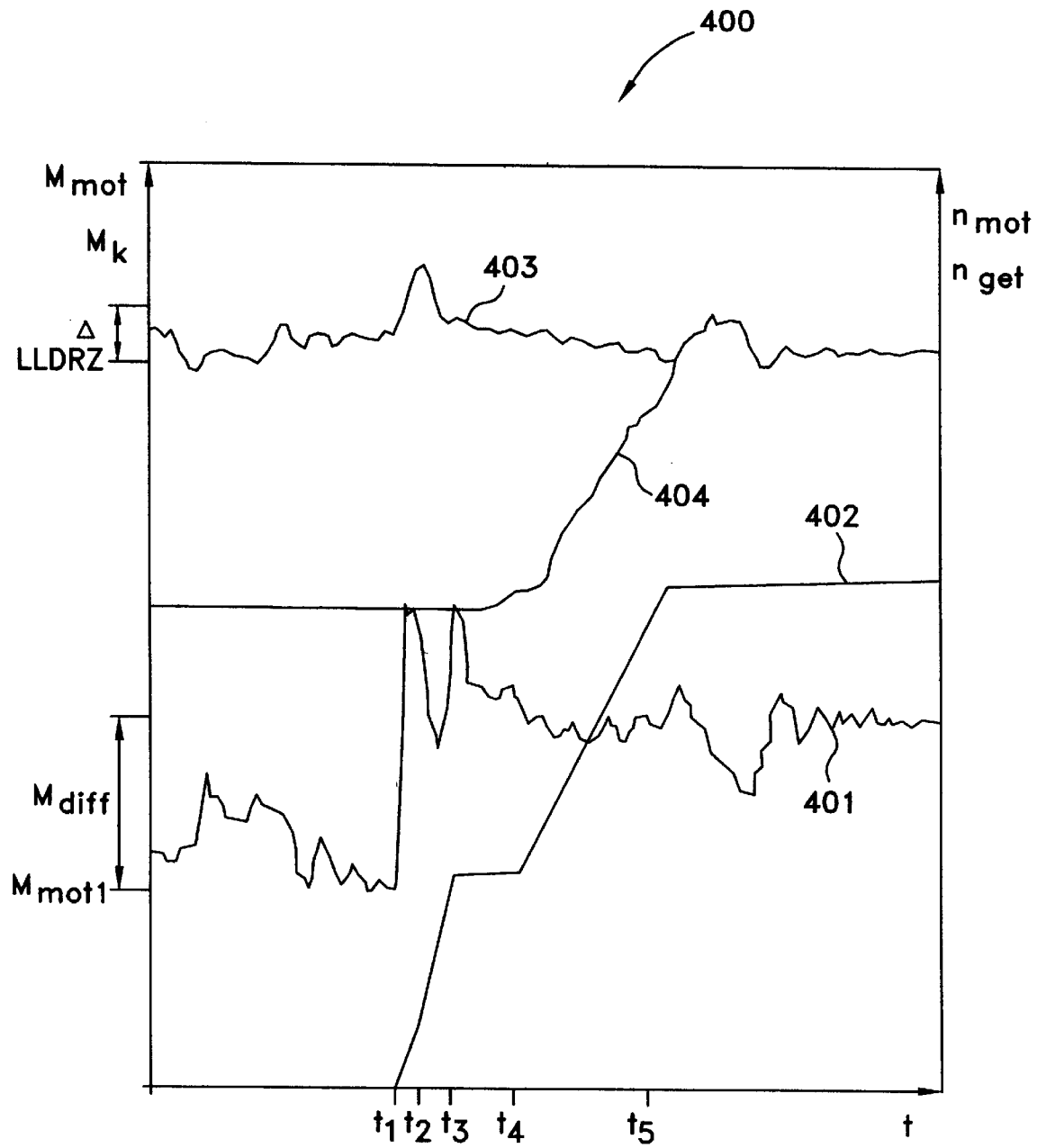
FIG. 8 is a second coordinate system wherein the curves denote different relationships between the torques of the prime mover and the automated torque transmitting system as well as between the rotational speeds of the prime mover and the input element of the transmission.

FIG. 8 further shows that, basically, the transmission RPM nget (curve 404) begins to increase only from the instant t4 on. From this instant on, the torque Mk which can be transmitted by the clutch (see the curve 402) and the transmitted engine torque Mmot (curve 401) suffice to maintain the motor vehicle in motion.

The selected torque Mk which can be transmitted by the clutch (curve 402) rises during the intervals when Mmot−Mmot1 is less than Mdiff or when Mmot−Mmot1 is greater than Mdiff and nmot is greater than LLDRZ+WERT. As already mentioned above, LLDRZ denotes the idling RPM of the engine and WERT is a preselectable value, for example, in the range of between 20 and 200 l/min.

It is of particular advantage if the means for ascertaining or determining the engine torque Mmot and/or the system which compares a rise or drop of torque Mk (i.e., the torque which is transmittable by the clutch 3 or 102) with a rise or drop of the engine torque Mmot is integrated into the control unit 13 or 107 of the means for operating the electronically operated automated clutch 3 or 102 or into the electronic engine circuit (such as 50 or 160).

Reference should also be had to the following additional foreign patent applications and/or patents and/or to corresponding U.S. patents and/or allowed U.S. patent applications (the disclosures of all such U.S. patents and allowed U.S. patent applications are incorporated herein by reference):

PCT/DE 95/01861 and PCT/DE 96/01242 as well as DE 146 16 055, DE 196 37 001, DE 196 36 005, DE 196 22 572, DE 196 02 421, DE 195 47 082, DE 196 22 643, DE 196 09 924, DE 196 02 874, DE 196 09 957, DE 196 11 147, DE 196 31 726, DE 196 45 358, DE 196 22 641, DE 196 24 008, DE 196 25 950, DE 196 32 946, DE 196 29 969, DE 196 28 199, DE 42 39 289, DE 196 21 123, DE 196 08, 454, DE 195 04 487 and DE 196 23 484. These applications disclose, among others, apparatus for and methods of actuating automated torque transmitting systems and/or transmissions, such as automated transmissions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of regulating crawling movements of motor vehicles and, therefore, such adaptations should and are intended to be comprehended within the meaning and range of equivalence of the appended claims.

What is claimed is:

1. In a motor vehicle, a power train comprising a prime mover; a transmission system shiftable into a plurality of different gears; an automated torque transmitting system actuatable to assume engaged and disengaged conditions as well as partly engaged conditions for transmission of torque at a rate which, when said transmission system is in one of said gears and said torque transmitting system assumes at least one of said partly engaged conditions, results in a crawling movement of the vehicle; and means for operating said automated system including a signal receiving and signal transmitting control unit and means for actuating said automated system for transmission of torque at said rate in response to signals from said control unit to repeatedly ensure predetermined crawling movements of the vehicle, said system being arranged to transmit torque which is changeable between a first value and a second value and at least one of (a) the torque of said prime mover and (b) the rise of torque being transmitted by said prime mover at least approximating a predeterminable value when the torque being transmitted by said system at least approximates said second value.

2. The power train of claim 1, wherein said automatic torque transmitting system comprises a friction clutch.

3. The power train of claim 1, wherein said means for actuating comprises at least one actuator having at least one driving unit for a mobile input element of said automated torque transmitting system.

4. In a motor vehicle, a power train comprising an energy consuming, variable-speed, variable torque transmitting prime mover; at least one brake engageable to influence the speed of the vehicle; a member operable to regulate the admission of energy to said prime mover; a transmission shiftable into a plurality of gears; an automated torque transmitting system actuatable to assume engaged and disengaged conditions as well as partly engaged conditions; means for operating said system including a signal receiving, processing and transmitting control unit, and means for actuating said system in response to signals from said control unit; and means for transmitting to said control unit signals denoting the condition of said at least one brake, the condition of said member, and changes of torque being transmitted by at least one of said prime mover and said system, said control unit comprising means for comparing torques being transmitted by said system with torques being transmitted by said prime mover and for causing, in the disengaged condition of said at least one brake and in the non-operated condition of said member, said system to assume that one of said partly engaged conditions in which the vehicle is crawling in response to shifting of said transmission into one of said gears with a resulting change of torque being transmitted by said system from a first value to a second value, at least one of (a) the torque of said prime mover and (b) the rise of torque being transmitted by said prime mover at least approximating a predeterminable value when the torque being transmitted by said system at least approximates said second value.

5. The power train of claim 4, wherein said automated torque transmitting system comprises a clutch.

6. The power train of claim 4, wherein said means for actuating said torque transmitting system comprises at least one actuator including at least one driving unit for a mobile input element of said system.

7. The power train of claim 4, wherein said means for transmitting signals comprises an electronic circuit for said prime mover.

8. The power train of claim 4, wherein said resulting change of torque being transmitted by said system from said first value to said second value involves a rise of torque.

9. The power train of claim 4, wherein said means for transmitting signals includes means for transmitting to said control unit signals denoting a difference Dmot2−Dmot1 wherein Dmot1 is a first torque being transmitted by said prime mover essentially prior to assumption by said system of said one partly engaged condition and Dmot2 is a second torque being transmitted by said prime mover while the vehicle is crawling.

10. The power train of claim 4, wherein said means for transmitting signals includes means for carrying out at least one the operations including (a) ascertaining and (b) determining the torque being transmitted by said prime mover while said system assumes said disengaged condition.

11. The power train of claim 4, wherein said means for transmitting signals includes means for repeatedly determining or ascertaining, as a function of time, the torque which is being transmitted by said prime mover.

12. The power train of claim 4, wherein said means for transmitting signals includes means for ascertaining or determining and transmitting to said control unit signals denoting that particular torque which is being transmitted by said prime mover during shifting of said transmission into one of said gears, said control unit further comprising means for comparing said particular torque with said predeterminable value and said operating means including means for preventing automatic changes in the condition of said system when said particular torque at least approximates said predeterminable value.

13. The power train of claim 4, wherein said means for transmitting signals includes means for ascertaining and transmitting to said control unit first and second signals respectively denoting the torque being transmitted by said prime mover to said system during and prior to shifting of said transmission into one of said gears, said control unit comprising means for generating third signals denoting differences between said first and second signals and for comparing characteristics of said third signals with characteristics of a fourth signal denoting said predeterminable value, said actuating means including means for preventing automatic changes in the condition of said system when said characteristics of a third signal at least approximate the characteristics of said fourth signal.

14. The power train of claim 4, wherein said means for transmitting signals includes means for ascertaining and transmitting to said control unit first signals denoting the torque being transmitted by said prime mover prior to shifting of said transmission into said one gear and while said system is at least substantially disengaged and for ascertaining and transmitting to said control unit second signals denoting the torque being transmitted by said prime mover while the vehicle is crawling, said actuating means comprising means for thereafter changing the condition of said system in a sense to increase the torque which is transmittable by said system, said control unit comprising means for ascertaining the difference between said first and second signals and said actuating means being operative to prevent a change in the condition of said system or to reduce the extent of engagement of said system by a preselectable value including zero in response to at least one of (a) a rise of the prime mover torque denoted by said second signals and (b) a rise of said difference beyond a threshold value.

15. The power train of claim 4, wherein said means for transmitting signals includes means for indirectly ascertaining the changes of torque being transmitted by said prime mover.

16. The power train of claim 4, wherein said means for transmitting signals includes a circuit arranged to transmit to said control unit signals denoting the torque being transmitted by said prime mover.

17. The power train of claim 4, wherein said control unit includes means for ascertaining the torque being transmitted by said prime mover.

18. The power train of claim 4, wherein said means for transmitting signals to said control unit includes a data bus for signals denoting the torque being transmitted by said prime mover.

19. The power train of claim 4, wherein said member is a mobile member having a plurality of positions and said means for transmitting signals includes means for ascertaining the torque being transmitted by said prime mover on the basis of at least one of a plurality of parameters of said prime mover including the RPM of a rotary component of the prime mover, the position of a mobile element of a throttle valve of the prime mover, the position of said member, the quantity of energy in the form of fuel being injected into cylinders of the prime mover, the timing of fuel injection, and changes of the RPM of said rotary component per unit of time.

20. The power train of claim 4, wherein said control unit comprises at least one memory for recoverable information pertaining to the torque being transmitted by said prime mover.

21. The power train of claim 4, wherein said control unit comprises means for generating signals denoting changes of the to torque being transmitted by said at least one of said prime mover and said system.

22. The power train of claim 4, wherein said control unit comprises means for comparing signals denoting changes of torque being transmitted by said at least one of said prime mover and said system.

23. The power train of claim 4, wherein said actuating means includes at least one actuator which is coupled with said system.

24. The power train of claim 4, wherein said actuating means is arranged to select the condition of said system in dependency upon at least one function.

25. The power train of claim 24, wherein said at least one function is a function of at least one of (a) time, (b) torque being transmitted by said prime mover, (c) the RPM of a rotary part of said prime mover, and (d) the speed of the motor vehicle.

26. The power train of claim 24, wherein said at least one function is a function of time within at least one predetermined interval of time.

27. The power train of claim 4, wherein said actuating means is arranged to select the condition of said system in dependency upon a first function of time during a first interval, and in dependency upon a second function of time during a second interval.

28. The power train of claim 27, wherein said actuating means is arranged to change the condition of said system from the disengaged condition to a preselectable partly engaged condition during said first interval, and to change the condition from said preselectable partly engaged condition to a different condition during said second interval.

29. The power train of claim 27, wherein said actuating means is arranged to change the condition of said system from the disengaged condition to a partly engaged first condition during said first interval and to a second condition of engagement more pronounced than said first condition, said second condition being reached when a predetermined value is assumed by at least one of (a) the torque being transmitted by said prime mover and (b) a difference between first and second torques being transmitted by said prime mover.

30. The power train of claim 29, wherein said operating means is arranged to adjust said system toward said disengaged condition to thus reduce the magnitude of the torque being transmitted by said system upon reaching of said second condition.

31. The power train of claim 29, wherein said operating means is arranged to adjust said system toward said disengaged condition to thus reduce by a predetermined value the magnitude of the torque being transmitted by said system upon reaching of said second condition.

32. The power train of claim 4, wherein said operating means is arranged to select the condition of said system in dependency upon at least one of functions of time including (a) a linear function, (b) a square function, and (c) an exponential function.

33. The power train of claim 4, wherein said actuating means is arranged to vary the condition of said system at a first speed during a first interval of time and at a second speed during a second interval of time.

34. The power train of claim 4, wherein said control unit includes means for terminating the crawling of the vehicle and for simultaneously changing the condition of said system toward said disengaged condition as a function of time.

35. The power train of claim 34, wherein said means for terminating is responsive to engagement of said brake.

36. The power train of claim 34, wherein said means for changing the condition of said system toward said disengaged condition is arranged to reduce the ability of said system to transmit torque during a first interval of time and to further reduce the ability of said system to transmit torque to a preselectable value during a second interval of time.

37. The power train of claim 36, wherein said preselectable value at least approximates zero.

38. The power train of claim 4, wherein said actuating means comprises means for regulating the condition of said system by controlling the extent of movement of a mobile part of said system as a function of a characteristic curve denoting a relationship between the extent of movement of said mobile part and the torque being transmittable by said system.

39. The power train of claim 4, wherein said actuating means comprises means for controlling or regulating the torque being transmitted by said system from a lower first torque to a higher second torque at which the motor vehicle is being driven at a preselectable speed.

40. The power train of claim 4, wherein said actuating means comprises means for controlling or regulating the torque being transmitted by said system from a lower first torque to a higher second torque at which the torque being transmitted by said prime mover assumes a preselectable value.

41. The power train of claim 4, wherein said actuating means comprises means for controlling or regulating the torque being transmitted by said system from a lower first torque to a higher second torque at which the torque being transmitted by said prime mover is increased by a preselected value.

42. In a motor vehicle, a power train comprising an energy consuming, variable-speed variable torque transmitting prime mover; at least one brake engageable to influence the speed of the vehicle; a member operable to regulate the admission of energy to said prime mover; a transmission shiftable into a plurality of gears; an automated torque transmitting system actuatable to assume engaged and disengaged conditions as well as partly engaged conditions; means for operating said system including a signal receiving, processing and transmitting control unit, and means for actuating said system in response to signals from said control unit; and means for transmitting to said control unit signals denoting the condition of said member, and the torque being transmitted by said prime mover in the at least substantially disengaged and in at least partially engaged conditions of said system, said control unit comprising means for causing, in the disengaged condition of said at least one brake and in the non-operated condition of said member, said system to assume that one of a plurality of partly engaged conditions in which the vehicle is crawling in response to shifting of said transmission into one of said gears with a resulting rise of torque being transmitted by said system from a first value to a higher second value which is reached when a difference between the torques being transmitted by said prime mover in said at least one substantially disengaged and said at least one partly engaged conditions of said system assumes a preselected value.

43. The power train of claim 42, wherein said actuating means comprises at least one actuator.

44. The power train of claim 42, wherein said automated torque transmitting system comprises a clutch.

45. The power train of claim 42, wherein said means for transmitting signals includes an electronic circuit for said prime mover.

46. A method of varying the condition of an automated torque transmitting system which has engaged and disengaged conditions and a plurality of partly engaged conditions and is installed in a power train of a motor vehicle wherein the power train further comprises a torque transmitting prime mover, a transmission shiftable into a plurality of gears, means for operating the torque transmitting system including a signal receiving and signal transmitting control unit and actuating means arranged to effect changes in the condition of the torque transmitting system in response to signals from the control unit, and means for transmitting to the control unit first signals denoting the torque being transmitted by the prime mover and second signals denoting differences between varying torques Mk1 and Mk2 being transmitted by the torque transmitting system on the one hand and varying torques being transmitted by the prime mover on the other hand, comprising the steps of:

ascertaining the torque Mmot1 being transmitted by the prime mover in at least substantially disengaged condition of the torque transmitting system;

shifting the transmission into gear to effect a crawling movement of the vehicle in response to a change in the condition of the torque transmitting system to a partly engaged condition with attendant rise of the torque being transmitted by the torque transmitting system from a first to a second value while each vehicle brake is disengaged and the gas pedal is idle;

ascertaining the torque Mmot2 of the prime mover during said shifting of the transmission into gear;

thereafter increasing the torque being transmitted by the prime mover;

comparing the difference Mk2-Mk1 with the difference Mmot2-Mmot1; and raising Mk2 until one of Mmot2-Mmot1 and Mmot2 matches a preselected torque.

47. The method of claim 46, wherein at least one of Mmot2-Mmot1 and Mmot2 is in the range of between about 5 and 50 Nm.

48. The method of claim 47, wherein said range is between about 8 and 20 Nm.

49. The method of claim 46, wherein at least one of Mmot2-Mmot1 and Mmot2 is about 10 Nm.

50. The method of claim 46, wherein Mk2 is in the range of between about 5 and 50 Nm.

51. The method of claim 50, wherein said range is between about 10 and 40 Nm.

52. The method of claim 46 wherein Mk2 is about 30 Nm.

* * * * *